US007091715B2

(12) United States Patent
Nemirovsky et al.

(10) Patent No.: US 7,091,715 B2
(45) Date of Patent: Aug. 15, 2006

(54) METHOD AND APPARATUS FOR MICRO-MACHINED SENSORS USING ENHANCED MODULATED INTEGRATIVE DIFFERENTIAL OPTICAL SENSING

(75) Inventors: Yael Nemirovsky, Haifa (IL); Ofir Degani, Ashkelon (IL); Eran Socher, Tel Aviv (IL); Dan Seter, Haifa (IL)

(73) Assignees: Technion Research & Development Foundation Ltd., Technion (IL), part interest; Rafael - Armament Development Authority Ltd., Haifa (IL), part interest (*) Notice: Subject to any disclaimer, the term of this patent is extended or adjusted under 35 U.S.C. 154(b) by 183 days.

(21) Appl. No.: 10/416,736

(22) PCT Filed: Nov. 14, 2001

(86) PCT No.: PCT/IL01/01055

§ 371 (c)(1),
(2), (4) Date: Sep. 23, 2003

(87) PCT Pub. No.: WO02/41622

PCT Pub. Date: May 23, 2002

(65) Prior Publication Data

US 2004/0060355 A1    Apr. 1, 2004

(30) Foreign Application Priority Data

Nov. 15, 2000   (IL) ............................. 139695

(51) Int. Cl.
*G01R 31/308*   (2006.01)
(52) U.S. Cl. ................. 324/158.1; 324/753; 73/514.26
(58) Field of Classification Search ..................... None
See application file for complete search history.

(56) References Cited

U.S. PATENT DOCUMENTS 3,902,804 A    9/1975   Baxter (Continued)

FOREIGN PATENT DOCUMENTS

IL    122947    6/2001

OTHER PUBLICATIONS

J.A. Plaza, H.Chen, J. Esteve and E. Lora- Tamayo, "New bulk accelerometer for triaxial detection", Sensors and Actuators A: Physical, vol. 66, 1998, pp. 105-108, no month.

(Continued)

*Primary Examiner*—Minh N. Tang
(74) *Attorney, Agent, or Firm*—Edward Langer, Pat. Atty; Shiboleth, Yisraeli, Roberts, Zisman & Co.

(57) ABSTRACT

Method and apparatus for sensing the displacements of micromachined devices and sensors. The method is referred to as the enhanced modulated integrative differential optical sensing (EMIDOS). The target micromachined proof-mass, for which displacements are measured, includes a grid of slits. The micromachined device is bonded to a CMOS chip containing a matching photodiodes array and their readout electronics. The grid is aligned with the photociiodes. An illumination source, such as an LED, is then mounted above the micromachined device. A model for the noise equivalent displacement (NED), including mechanical, electrical and optical domains, as well as all noise sources is derived. The model predicts that displacements below $10^{-3}$ [$\sqrt{Hz}$] can be measured. The design comprises innovative inertial sensors, an accelerometer and a rategyroscope employing the EMIDOS. Performance models for the noise equivalent acceleration (NEA) and noise equivalent rate (NER) are also derived. The models show that an accelerometer with a very low NEA can be realized.

26 Claims, 30 Drawing Sheets

U.S. PATENT DOCUMENTS 5,600,065 A * 2/1997 Kar et al. ............... 73/504.12
6,257,059 B1 * 7/2001 Weinberg et al. ........ 73/504.16
6,350,983 B1 * 2/2002 Kaldor et al. ............ 250/231.1
6,581,465 B1 * 6/2003 Waters et al. ............ 73/514.26

OTHER PUBLICATIONS

Y. Nemirovsky, A. Nemirovsky, P. Muralt, N. Setter, "Design of a novel thin-film piezoelectric accelerometer", Sensors and Actuators A: Physical, vol. 56, 1996, pp. 239-249, no month.

U.A. Dauderstadt, P.H.S. De Vries, R. Hiratsuka, P.M. Sarro, "Silicon accelerometer based on thermopiles", Sensors and actuators A: Physical, vol. 46-47, 1995, pp. 201-204, no month.

T.B. Gabrielson, "Mechanical-Thermal Noise in Micromachined Accoustic and Vibration Sensors", IEEE Transactions on Electron Devices, vol. 40, No. 5, May 1993.

R. L. Kubena, D. J. Vickers-Kirby, R. J. Joyce, Frederick P. Stratton, "A New Tunnelling-Based Sensor for Inertial Rotation Rate Measurements", JMEMS, vol. 8, No. 4, Dec. 1999.

T. Storgaard-Larsen, S. Bouwstra, O. Leistiko, "Opto-Mechanical Accelerometer Based on Strain Sensing by a Bragg Grating in a Planar Waveguide" Sen. & Act. A: Phys., vol. 52, no month/year.

G. Schopfer, W. Elflein, M. De Labachelerie, H. Porte, S. Ballandras, "Lateral Optical Accelerometer Micromachined . . . Coherence Modulation", Sen. and Act. A: Physical, vol. 68, no month/year.

B.E. Boser, R.T. Howe, "Surface Micromachined Accelerometer", J. of Solid-State Circuits, vol. 31, No. 3, Mar. 1996, pp. 366-375.

R.Voss, K. Bauer, W. Ficker et al, "Silicon Angular Rate Sensor for Automative Applications with . . . Read-out", Proc. of Transducers '97, Chicago, Jun. 16-19, 1997,pp. 879-249.

M. Weinberg, J. Connelly et al, "Microelectromechanical Instrument & Systems Development at the . . . ", Proc. of the IEEE Digital Avionics Systems Conf., 1997,pp. 8.5-33-8.5-40, no month.

M. Bao, H. Yang, H. Yin, S. Shen "Effects of Electrostatic Forces Generated by the Driving Signal on . . . ", Sensors & Actuators A:Physical, vol. 84, 2000, pp. 213-219, no month.

D. D. Lynch, "Coriolis Vibratory Gyros", Proc. of GYRO Technology symposium, Stuttgart, Germany, Sep. 15-16, 1998, pp. 1.0-1.14.

H.K. Rockstad, T.W. Kenny, J.K. Reynolds, W.J. Kaiser "A Miniature High-Sensitivity Broad-Band Accelerometer . . . " Sensors & Actuators A:Physical, vol. 43, 1994, pp. 107-114, no month.

S.P. Timoshenko, I.N. Goodier, Theory of Elasticity, Mc-Graw-Hill, New-York, 1970 (book-not provided), no month.

O. Degani, "Investigation of Microelectromechanical Systems employing Modulated Integrative Differential Optical . . . ", M.Sc. Thesis, Supervised by Y. Nemirovsky, Technion, 1999, no month.

* cited by examiner (a)

(c)

(b)

(d)

(e)

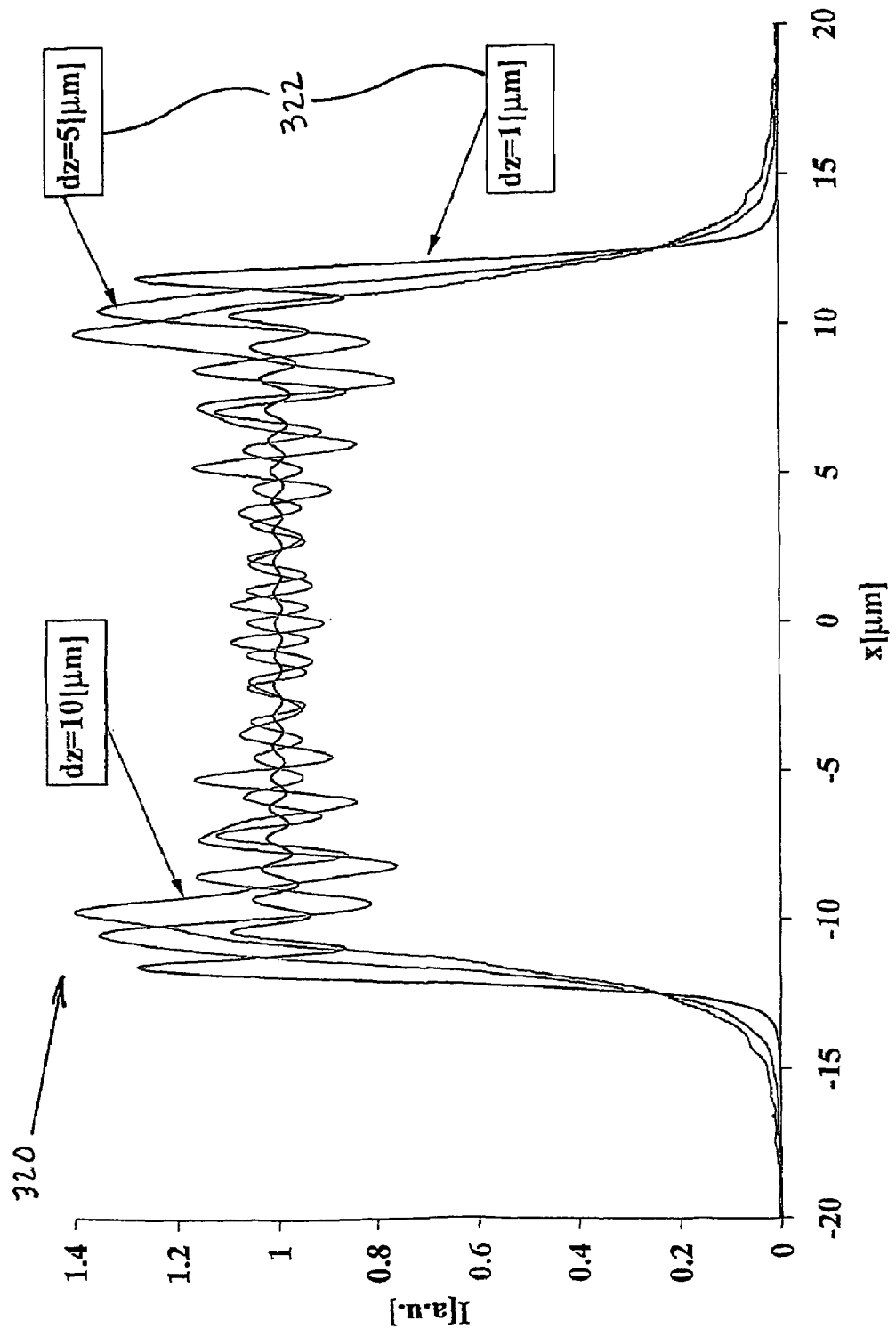

METHOD AND APPARATUS FOR MICRO-MACHINED SENSORS USING ENHANCED MODULATED INTEGRATIVE DIFFERENTIAL OPTICAL SENSING

CROSS-REFERENCE TO RELATED APPLICATION

The present application is related to Israel Patent Application No. 122,947, filed Jan. 15, 1998, entitled "Micro-electro-opto-mechanical inertial sensor with integrative optical sensor" which is assigned to the co-assignees of the present patent application and is incorporated herein by reference.

The present application claims priority of Israel Patent Application No. 139695 filed 15 Nov. 2000, assigned to the co-assignees, and entitled "METHOD AND APPARATUS FOR MICRO-MACHINED SENSORS USING ENHANCED MODULATED INTEGRATIVE DIFFERENTIAL OPTICAL SENSING".

FIELD OF THE INVENTION

The present invention relates generally to sensing the motion of micro-machined devices, and specifically to sensing sub-picometer range motion in inertial grade gyroscopes and accelerometers.

BACKGROUND OF THE INVENTION

For several decades microelectronics progressed in decreasing size while simultaneously increasing complexity. Mechanical structures can now be fabricated to comparable dimensions, and can be highly integrated with the electronics into microelectromechanical systems (MEMS).

MEMS can now be realized as sensors, actuators or mechanical structures. Products using MEMS are used in such life-saving devices as airbag accelerometers and disposable blood-pressure transducers to monitor the heart rate. MEMS devices have become more complex, and have incorporated an increasing number of features, progressing from components to electronic systems. The trend is measured in terms of the level of integration of MEMS mechanic and electronics.

The motion of the micro mechanical elements in microsensors is generally proportional to a particular physical measurement of interest, such as acceleration or partial pressure. Therefore it is important to sense this motion, in-order to reproduce the physical measure. In devices of more general application, the motion sensing may be used for feedback control, for example, to restore the micro-machined device to its original physical location. In high-grade sensors, such as inertial grade gyroscopes and accelerometers, as well as high-grade microphones, the sensing of motion in the sub-picometer (pm) range is required. Moreover, the motion sensing apparatus, itself, should be small and integrative, in-order to function effectively in the dimensions of the micro-machined devices.

Although the same laws of physics apply in three-dimensional structures, in the micron and sub-micron scales, nonlinear effects that are generally negligible in the macro-environment become more significance. Generally, micro-machined proof-masses can move in six degrees of freedom: three along linear axes: x,y and z; and three angles of rotation about these axes.

The main factor that limits the minimum detectable displacement is the noise sources that sensing systems are susceptible to. Spurious noise sources include mechanical noise, electrical noise, light noise, etc. Noise sources can be either "white" noise, that is frequency independent, or frequency dependent, for example "1/f" noise that is inversely dependent on frequency.

Many motion sensing techniques are known in the art of micro-machined sensors and devices, as described in the following background references:

[1] J. A. Plaza, H. Chen, J. Esteve and E. Lora-Tamayo, "New bulk accelerometer for triaxial detection", Sensors and Actuators A: Physical, Vol. 66, 1998, pp. 105–108.

[2] R. Voss, K. Bauer, W. Ficker, T. Gleissner, W. Kupke, M. Rose, S. Sassen, J. Schalk, H. Seidel and E. Stenzel, "Silicon angular rate sensor for automotive applications with piezoelectric drive and piezoresistive read-out", Proc. of Transducers'97, Chicago, 16–19 Jun. 1997, pp. 879–882.

[3] Y. Nemirovsky, A. Nemirovsky, P. Murlat and N. Setter, "Design of a novel thin-film piezoelectric accelerometer", Sensors and Actuators A: Physical, Vol. 56, 1996, pp. 239–249.

[4] B. E. Boser and R. T. Howe, "Surface micromachined accelerometers", J. of Solid-State Circuits, Vol. 31, No. 3, March 1996, pp. 366–375.

[5] M. Weinberg, J. Connelly, A. Kourepenis and D. Sargent, "Microelectromechanical instrument and systems development at the Charles Stark Draper Laboratory, INC.", Proceedings of the IEEE Digital Avionics Systems Conference, 1997, pp. 8.5–33–8.5–40.

[6] H. K. Rocksatd, T. W. Kenny, J. K. Reynolds, W. J. Kaiser and T. B. Gabrielson, "A miniature high-sensitive broad-band accelerometer based on electron tunneling transducers", Sensors and Actuators A: Physical, Vol. 43, 1994, pp. 107–114.

[7] R. L. Kubena, D. J. Vickers-Kirby, R. J. Joyce and Frederick P. Stratton, "A new tunneling based sensor for inertial rotation rate measurements", JMEMS, Vol. 8, no. 4, December 1999, pp. 439–447.

[8] U. A. Dauderstadt, P. H. S. de Vries, R. Hiratsuka and P. M. Sarro, "Silicon accelerometer based on thermopiles", Sensors and Actuators A: Physical, Vol. 46–47, 1995, pp. 201–204.

[9] O. Degani, "Investigation of Microelectromechanical Systems employing Modulated Integrative Differential Optical Sensing", M. Sc. Thesis, Supervised by Y. Nemirovsky, Technion, 1999.

[10] T. Storgaard-Larsen, S. Bouwstra and O. Leistiko, "Opto-mechanical accelerometer based on strain sensing by bragg grating in a planar waveguide", Sensors and Actuators A: Physical, Vol. 52, 1996, pp. 25–32.

[11] G. Schopfer, W. Elflein, M. de Labachelerie, H. Porte and S. Ballandras, "Lateral optical accelerometer micro-machined in (100) silicon with remote readout based on coherence modulation", Sensors and Actuators A: Physical, Vol. 68, 1998, pp. 344–349.

[12] T. B. Gabrielson, "Mechanical-Thermal Noise in Micromachined Acoustic and Vibration Sensors", IEEE Trans. On Elec. Dev., Vol. 40, No. 5, May 1993.

[13] M. Bao, H. Yang, H. Yin and S. Shen, "Effects of electrostatic forces generated by the driving signal on capacitive sensing devices", Sensors and Actuators A: Physical, Vol. 84, 2000, pp. 213–219.

[14] S. P. Timoshenko, I. N. Goodier, Theory of Elasticity, McGraw-Hill, New-York, 1970.

[15] D. D. Lynch, "Coriolis vibratory gyros", Proc. of GYRO technology symposium, Stuttgart, Germany, 15–16 Sep. 1998, pp. 1.0–1.14.

As described in the above references, the known motion sensing techniques using micro-machined sensors and devices include: piezoresistive [1,2], piezoelectric [3], capacitive [4,5], tunneling [6,7], thermal [8] and optical [9–11] sensing. Few methods have shown the capability for sensing motions in the sub-picometer range.

The most sensitive method, so far, is based on the tunneling effect between a sharp tip and a facing electrode. It has been shown theoretically [12] that the Noise Equivalent Displacement (NED) of this method, at the medium frequencies range, is in the order of $10^{-2}$–$10^{-3}$[pm/$\sqrt{Hertz}$] ($10^{-4}$–$10^{-5}$[_/$\sqrt{Hertz}$]) (Hz). Nevertheless, the tunneling effect suffers from inherent "1/f" noise, up to the range of a few Kilohertz (KHz), and its apparatus is quite difficult to realize. Moreover, due to the close proximity required between the tip and the facing electrode, of the order of a few _ (Angstrom units), the sensing is adversely affected by a relatively high damping coefficient and thus a high thermal-mechanical noise.

Another technique, which is the one most commonly used in micro-machined devices, and which have shown to be sufficiently sensitive, is capacitive sensing. This method is rather simple to realize and is highly integrable. Capacitive sensing does not suffer from inherent noise sources. The noise of the capacitive transducer is mainly contributed by the electronic readout circuits or by thermal-mechanical noise. Therefore, by proper design of the electronic readout, capacitive sensing is limited only by thermal-mechanical noise, and theoretically a NED of $10^{-2}$[pm/$\sqrt{Hz}$] ($10^{-4}$[_/$\sqrt{Hz}$]) can be achieved.

Capacitive sensing, on the other hand, suffers from possible cross talk with the electronic readout signals, which may exert a parasitic force on the device [13]. Moreover, without proper shielding it may suffer from Electromagnetic Interference (EMI). Due to the close proximity between the capacitor plates, which is required to achieve high sensitivity, the capacitive transducer is subjected to a rather high damping coefficient, which results in a higher thermal-mechanical noise. To lower the damping, vacuum encapsulation is usually required for high-grade sensors.

More recently, a piezoresistive configuration with a high degree of symmetry was reported to yield a NED in the order of a few [pm/$\sqrt{Hz}$], which is not quite low enough, but is rather near to the order required [14]. The piezoresistive method is quite easy to realize, and integrate, and was one of the first sensing methods to be used in micro-sensors. Moreover, it does not require close proximity between surfaces, and thus, benefits from a low damping coefficient and low thermal-mechanical noise. Nevertheless, it suffers from a high temperature coefficient, which limits the micro-sensor's performance.

Certain aspects of this problem are addressed in the above-referenced co-pending Israeli Patent Application No. 122,947, which is assigned to the assignees of the present patent application and discloses a viable system to sense sub-angstrom displacements. As with the capacitive method, MIDOS [9] does not suffer from inherent 1/f noise. As an improvement over capacitive methods, MIDOS is neither susceptible to EMI nor to cross talk from readout circuits. The integration of the motion sensing elements, the photodiodes, and the readout electronics on the same chip also reduces the system noise. Moreover, the sensing is based on in-plane motion, and close proximity is not required between the mechanical elements. Thus, the damping coefficient is lower, and the thermal-mechanical noise, also, is at lower vacuum levels than those required for the capacitive transducer. Nevertheless, the NED of the MIDOS technique is still far from achieving the demands of high-grade sensors.

No other sensing technique has as yet shown a NED lower than 1[pm/$\sqrt{Hz}$].

Thus there is a need for a micro-machined sensor capable of detecting motion in the sub-picometer range, and without the drawbacks of prior art devices.

SUMMARY OF THE INVENTION

Accordingly, it is a principal object of the present invention to overcome the limitations of existing micro-machined motion sensing systems, and to provide improved methods and apparatus for measurement of the motion of high-grade micro-machined devices.

It is a further object of some aspects of the present invention to provide improved methods and apparatus for an optically based motion sensing method [9], referred to as the Enhanced-Modulated Integrative Differential Optical Sensing (E-MIDOS).

It is a still further object of some aspects of the present invention to provide improved methods and apparatus for an optically based motion sensing method that is not subject to cross talk with the readout circuits and to EMI.

In accordance with a preferred method of the present invention, there is provided a method for an enhanced version of the MIDOS concept, referred to as E-MIDOS. By using this method the NED can be pushed towards to the sub-picometer range and down to $10^{-1}$[pm/$\sqrt{Hz}$] ($10^{-3}$[_/$\sqrt{Hz}$]) limit. This allows the design of high-grade sensors employing all of the advantages of the MIDOS concept.

In accordance with a preferred embodiment of the present invention, there is provided a system for micro-machined sensors using enhanced-modulated integrative differential optical sensing, comprising:

a fixed frame;

a CMOS chip comprising at least two integrated arrays of photodiodes and analog readout electronics;

an excitation proof-mass, elastically suspended by beams to said fixed frame;

a grid centered along the width of said excitation proof-mass;

a sensor proof-mass, elastically suspended at right angles to said excitation proof-mass by beams; and a second grid fixed to the frame of said excitation proof-mass, and added below said first grid, so as to substantially cover the slits of the first grid.

In some preferred embodiments of the present invention, part integration mode of E-MIDOS is implemented.

In an alternative embodiment of the present invention, full integration mode of E-MIDOS is implemented.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which:

FIG. 17a is a graph representing the effect of diffraction on the sensing of the displacement using EMIDOS, showing the diffraction patterns at the photodiodes plane for various distances, dz, between the grid and photodiodes, in accordance with an exemplary embodiment of the present invention.

DETAILED DESCRIPTION OF THE PREFERRED EMBODIMENTS

Figure 1A:
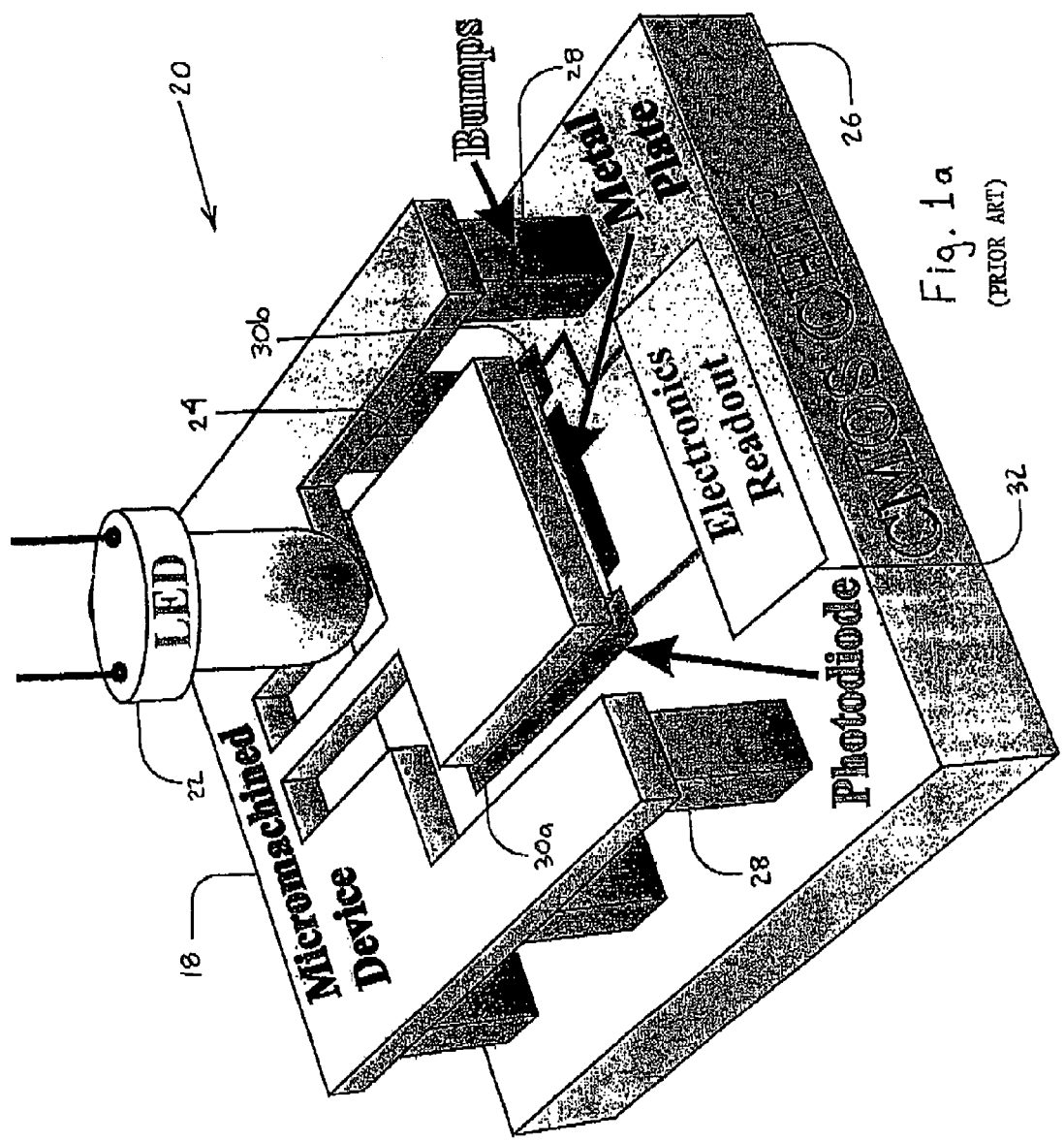
FIG. 1*a* is a 3-dimensional schematic illustration of a micro-machined sensor microsystem employing MIDOS, in accordance with the prior art.

Reference is now made to FIG. 1, which is a 3-dimensional schematic illustration of a micro-machined sensor microsystem employing the MIDOS method 20, in accordance with the prior art.

The apparatus is constructed from three main parts: an illumination source 22, in the form of a light-emitting diode (LED); a micro-machined suspended proof-mass 24 and a CMOS chip including photodetectors, such as photodiodes 30, and their readout electronics. The micro-machined device 18, a mechanical part, is flip-chip bonded to the CMOS chip 26 using indium bumps 28 technology. Proof-mass 24 is aligned with two photodiodes 30a and 30b, such that when no induced displacement is applied, an equal portion of photodiodes 30a and 30b is covered. The electronic readout 32 subtracts and amplifies the resulting photocurrents readout from photodiodes 30.

Figure 1B:
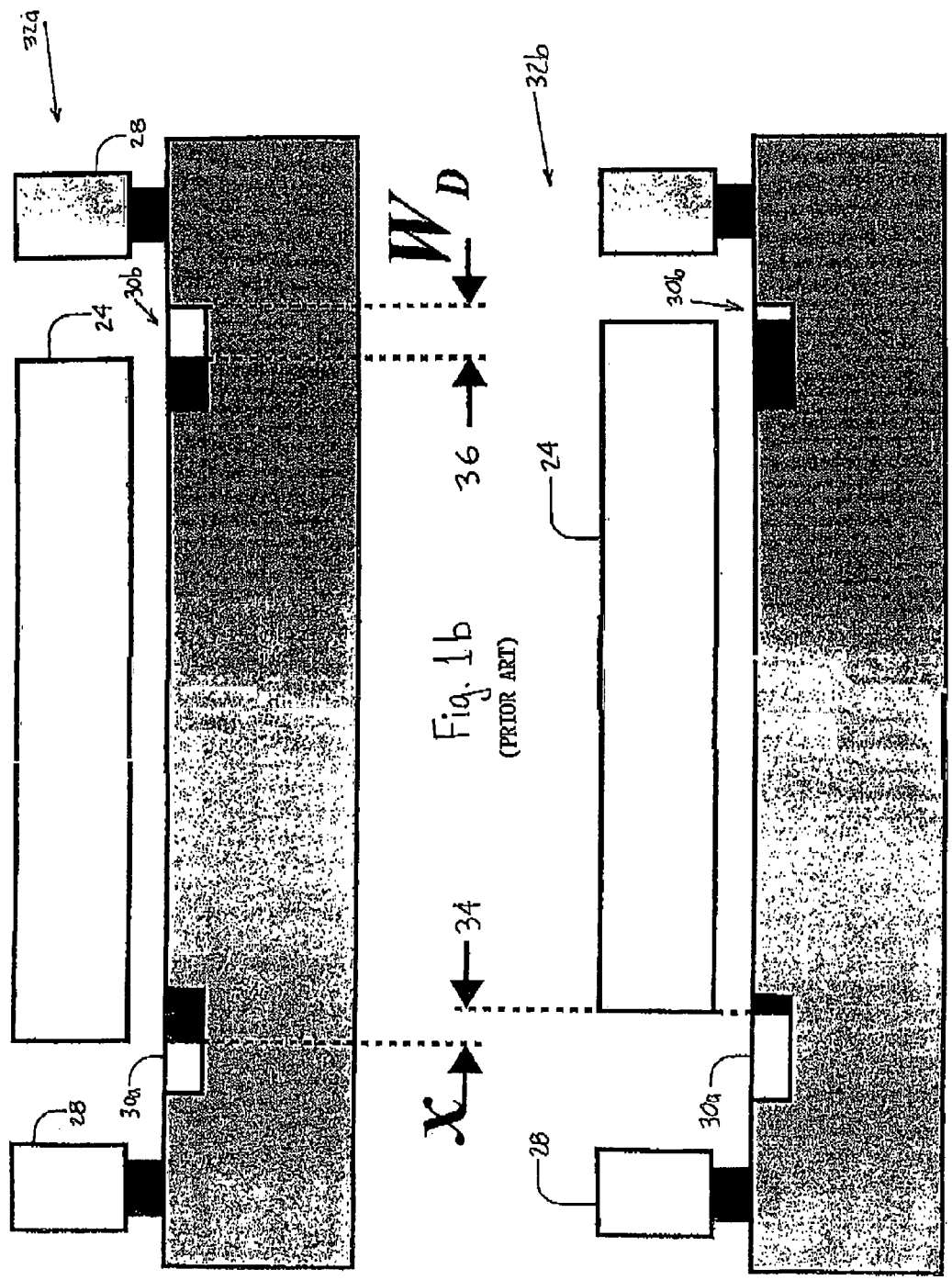
FIG. 1b is a schematic illustration of the cross-section of a micro-machined sensor microsystem employing MIDOS, in accordance with the prior art.

FIG. 1b is a schematic illustration of the cross-section of a micro-machined sensor microsystem employing MIDOS method 32, in accordance with the prior art. The MIDOS principle of operation is shown. Two views of microsystem 32 are shown: 32a is before a linear displacement 34 takes place; 32b is after linear displacement 34 takes place. When a linear displacement signal along the x-axis is induced, the uncovered portion of one photodiode 30a increases, while the uncovered portion of photodiode 30b decreases by the same amount. Thereupon, a differential photocurrent is electronically amplified, resulting in an electrical signal proportional to displacement 34.

The noise equivalent displacement (NED) of a microsystem employing the MIDOS method is given by $$S_x = \frac{qW_D}{L_D I_\Box R} \tag{1}$$

where $L_D$ and $W_D$ 34 are the length and width of the photodiodes 30, respectively, q is the electron charge, R is the responsivity of photodiodes 30 and $I_\Box$ the illumination intensity at the plane of photodiodes 30. Thus, longer and narrower photodiodes 30 improve the NED and also provide higher illumination intensity.

The E-MIDOS Principle

Figure 2A:
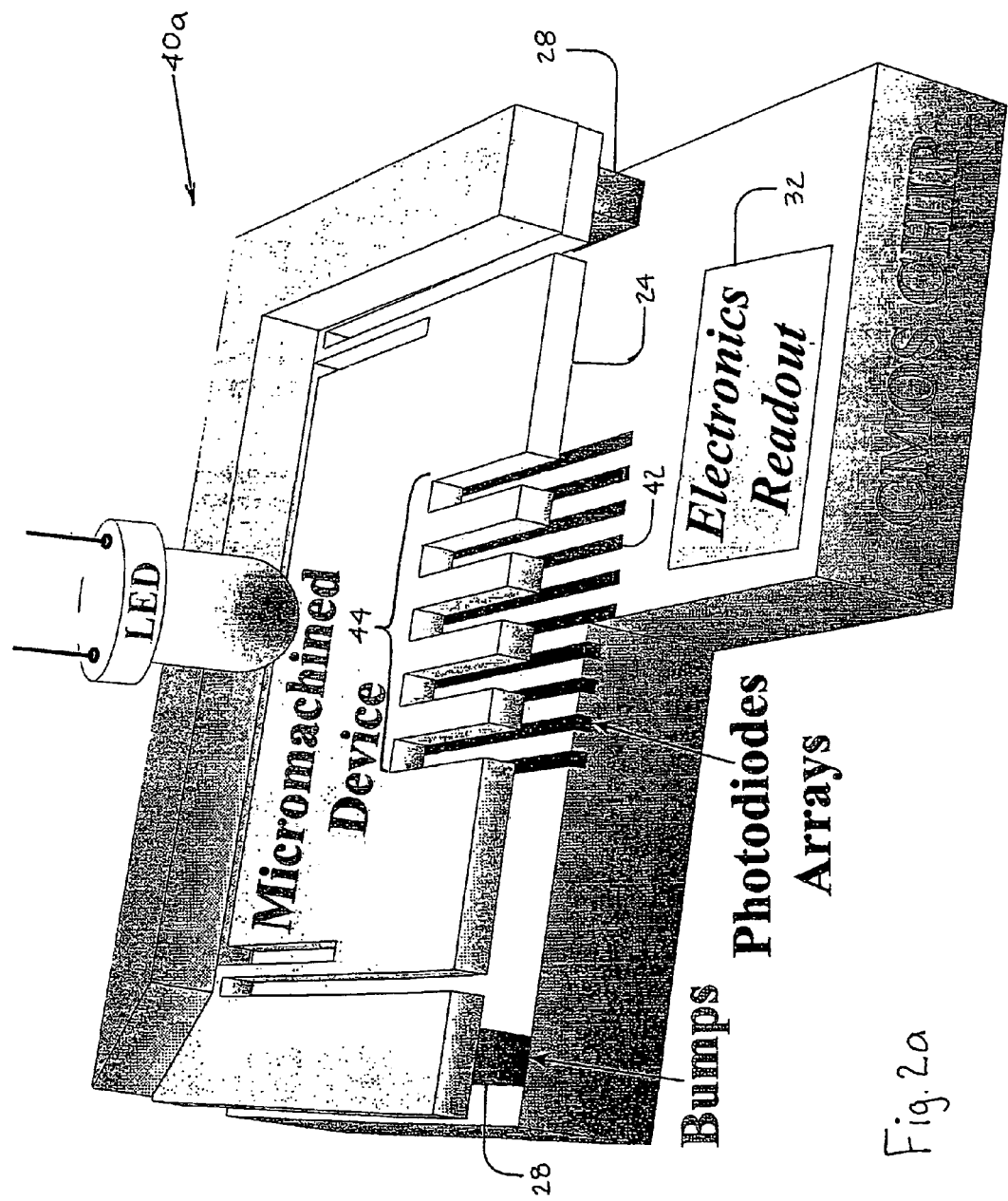
FIG. 2a is a 3-dimensional schematic illustration of a micro-machined sensor's microsystem employing E-MIDOS in part integration mode, in accordance with an exemplary embodiment of the present invention.
Figure 3A:
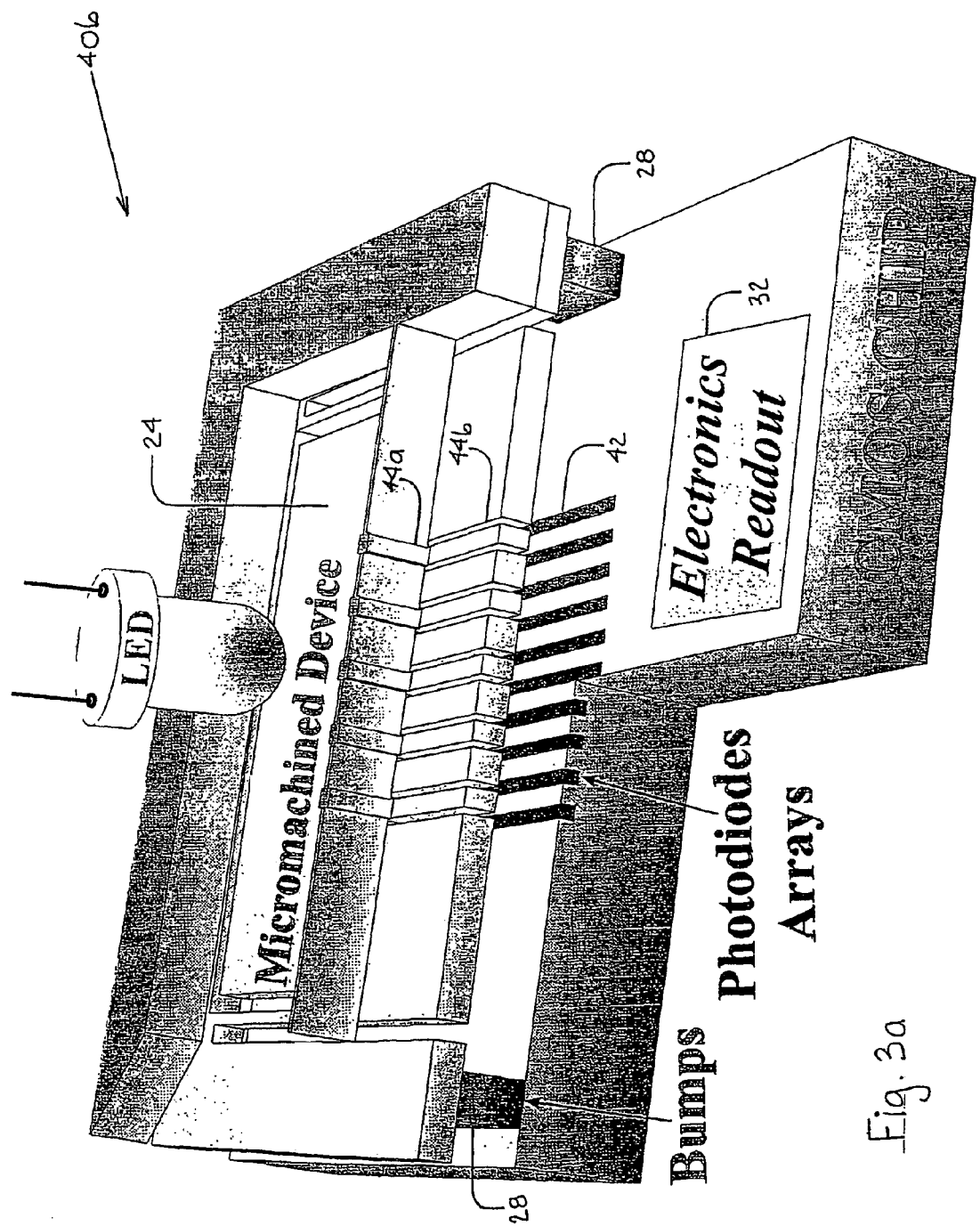
FIG. 3a is a 3-dimensional schematic illustration of a micro-machined sensor's microsystem employing E-MIDOS in a full integration mode, in accordance with an exemplary embodiment of the present invention.

FIGS. 2a and 3a are alternate embodiments of a micro-machined sensor's microsystem employing E-MIDOS 40.

FIG. 2a is a 3-dimensional schematic illustration of a micro-machined sensor's microsystem employing E-MIDOS in part integration mode 40a, in accordance with an exemplary embodiment of the present invention. The apparatus of microsystem includes the same three parts of MIDOS microsystem 20. Nevertheless, three main features differentiate E-MIDOS systems 40 from MIDOS 20 method:
(1) Photodiodes 30 are relocated in the center of proof-mass 24 rather than on the sides.
(2) Two photodiodes 30 are replaced with two arrays of photodiodes 42.
(3) Proof-mass 24 includes a matching grid 44 to photodiodes arrays 42.

The electronic readout 32 takes a summation by integration of the photocurrents of each array of photodiodes 42 and then subtracts and amplifies the resulting pair of summed electrical signals.

Figure 2B:
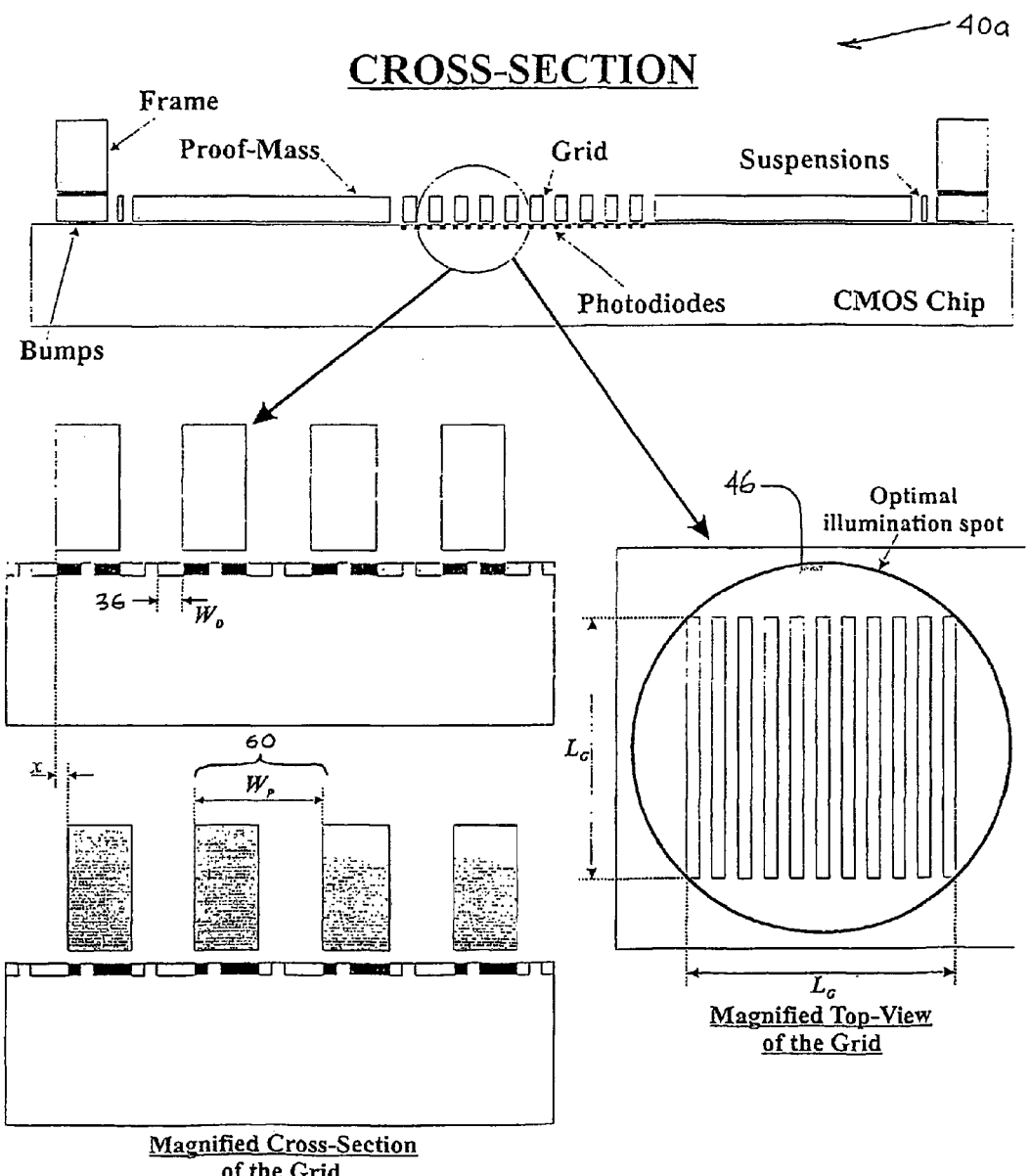
FIG. 2b is a schematic illustration of the cross-section of a micro-machined sensor's microsystem employing E-MIDOS in part integration mode, in accordance with an exemplary embodiment of the present invention.

FIG. 2b is a schematic illustration of the cross-section of a micro-machined sensor's microsystem employing E-MIDOS in part integration mode 40a, in accordance with an exemplary embodiment of the present invention. Similarly to MIDOS 20 method, when a displacement is induced, the uncovered (illuminated) area of one array of photodiodes 42a is increased, while the uncovered area of the second array 42b decreases. Thus, an electrical signal proportional to the displacement is recorded at the output of electronic readout 32.

Before proceeding with a more quantitative evaluation of the improvement in the NED using the E-MIDOS method 40, qualitative considerations are summarized as follows:
(1) The use of photodiodes' arrays 42 increases the effective length compared to that of pair of photodiodes 30. Thus, the average value of the displacement signal is increased and the NED is reduced.
(2) The use of a stack grid in proof-mass 24 forces the effective width of photodiodes arrays 42 to be reduced, and therefore reduces the noise.
(3) The relocation of photodiodes arrays 42 in the center of proof-mass 24 allows using the center of the illumination spot 46 rather than the tails. The illumination intensity is greater at the center, and thus reduces the NED. Moreover, by using this configuration illumination spot 46 can be concentrated to the area of photodiodes arrays 42, thus increasing the illumination intensity, and therefore further improving the NED.

FIG. 3a is a 3-dimensional schematic illustration of a micro-machined sensor's microsystem employing E-MIDOS in a full integration mode 40b, in accordance with an exemplary embodiment of the present invention. In part integration configuration 40a photodiodes arrays 42 were partially covered by the slit edge, and therefore the illumination 46 crossing the slit is partially collected and therefore included in the integration by arrays of photodiodes 42, and thus the name. In full integration mode configuration 40b photodiodes 42 are underlying each slit, thus collecting (integrating) all the illumination 46 that crosses the slit. The main difference between the two modes is that a second grid 44b is added covering the interstices of the first grid 44a. Second grid 44b is fixed to the frame of suspended proof-mass 24, and thus does not move with first grid 44a.

Figure 3B:
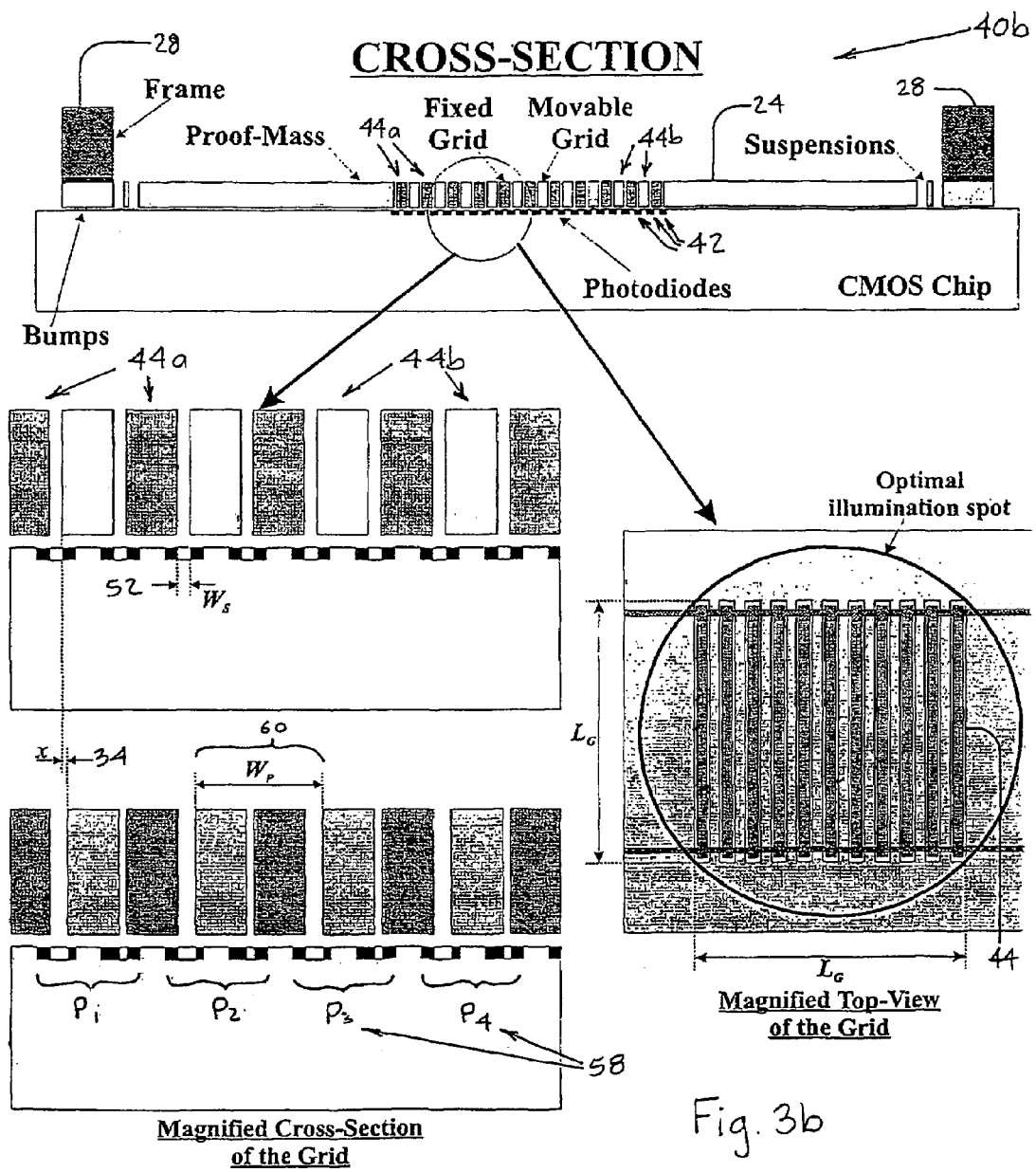
FIG. 3b is a schematic illustration of the cross-section of a micro-machined sensor's microsystem employing E-MIDOS in a full integration mode, in accordance with an exemplary embodiment of the present invention.

FIG. 3b is a schematic illustration of the cross-section of a micro-machined sensor's microsystem employing E-MIDOS in a full integration mode 46b, in accordance with an exemplary embodiment of the present invention. As a displacement is induced on the moving grid (i.e. the suspended proof-mass 24), the slits on one side of fixed grid 44b become narrower while on the other side become wider. Thus, the total illumination crossing the slits, and collected by arrays of photodiodes 42 underlying them, decreases on one side, while increasing on the other side of the fixed grid. By using the same electronics readout 32 the result is an electrical signal proportional to displacement 34.

The advantage of full-integration mode 40b over part-integration mode 40a is in better linearity. Since in part-integration mode 40a only part of illumination 46 crossing each slit is collected, the transfer function from displacement to photocurrent on the photodiode is highly dependent on the specific illumination pattern over the slit. Thus diffraction effects, if dominant, may cause the transfer function to be non-linear. For full-integration mode 40b all illumination 46 crossing the slit is collected by photodiode arrays 42, thus the transfer function is independent of the diffraction pattern. The illumination crossing the slit is linearly proportional to the slit width and therefore also the signal. The main drawback of full-integration mode 40b is its fabrication complexity. Thus, only when very narrow slits are to be used, where diffraction effects take a more dominant role, should full-integration mode 40b be used.

An Optoelectromechanical Model

Hereinbelow is derived a quantitative model for the output electrical signal of E-MIDOS microsystem 40 vs. input displacement 34 of the proof-mass 24. All noise sources of an integrated microsystem employing E-MIDOS 40 are discussed and a model for the NED of the microsystem 40 is also derived.

The Optoelectromechanical Transfer Function

The optical analysis of the microsystem 40 is based on the paraxial ray optics approximation. FIGS. 2b and 3b contain the dimensional definitions required for the analysis described hereinbelow. The use of the paraxial ray optics approximation is not straightforward, and the diffraction limitation is considered in several cases. A more detailed discussion of the diffraction limitation and its influence is given in Appendix A.

Nevertheless, as long as the slit width 52, $W_S$, is large compared to the illumination wavelength, $\lambda$, and the gap to the photodiodes, d, and the photodiodes nominal width 36, $W_D$, is fitted as well, the diffraction limitation can be neglected in part integration mode 40a. It should be emphasized that even if the above conditions do not prevail, the operating principle remains unchanged, because the response becomes non-linear for large displacements 34 (x).

In full-integration mode 40b the diffraction does not set any limit and paraxial optics can be used as long as photodiode width 36 is large enough to collect most of the illumination. It should be noted that as slit width 52 becomes smaller compared to the gap to the photodiodes, the diffraction effect is enhanced and the ratio of photodiode width 36 to nominal slit width 52 should be increased to collect the illumination properly. All of the above factors set some limitation on the minimum NED possible to sense using the E-MIDOS method.

Using the definitions described in FIGS. 2b and 3b and paraxial ray optics, and assuming a linear displacement of $\delta x$, the resulting photocurrent signal after subtraction, $\delta i$, is given by $$\delta i = 2 n I_\lambda R L_D \delta x \tag{2}$$

where n is the number of photodiodes pairs 58, $I_\square$ the illumination intensity, R the photodiodes' responsivity and $L_D$ the photodiodes' length. This formula for $\delta i$ is known as the transfer function of the opto-mechanical part.

It should be emphasized that the above relation is given for the current configuration of photodiode arrays 42. Other configurations may be chosen for measuring multi-axial, linear or angular displacements, which may result in a slightly different relation.

The Noise Sources

Now all the noise sources related with E-MIDOS microsystem 40 are considered. The noise model is necessary for the design considerations of system 40. The main factor that limits the minimum detectable displacement is the noise sources that sensing systems are susceptible to. Spurious noise sources include mechanical noise, electrical noise, light noise, etc. Noise sources can be either "white" noise, that is frequency independent, or frequency dependent, for example "1/f" noise that is inversely dependent on frequency.

The illumination source may be modulated if low frequency signals are to be resolved, thus eliminating the contribution of the electronics' 1/f noise. Therefore, throughout the following discussion the 1/f contribution will be neglected.

Electronics Noise

A typical electronics readout circuitry 32 is divided into two stages, a transimpedance amplification stage for each of the two photodiodes' arrays 42 and a subtraction stage. The input referred current noise spectral density of exemplary electronics readout circuitry 32 was shown to be $$S_I^{elec} = \frac{8 k_B T}{R_f} \tag{3}$$

where $k_B$ is the Boltzman constant, T is the temperature in degrees Kelvin and $R_f$ is the transimpedance stage feedback resistor and amplification. Throughout the derivation of the input referred noise the contribution of the amplifiers noise is neglected, since ultra-low noise amplifiers are preferably used.

The displacement referred noise of the electronics readout 32 is calculated using relations (2) and (3), and its spectral density is given by $$S_x^{elec} = S_I^{elec} \times \left|\frac{\delta x}{\delta i}\right|^2 = \frac{2 k_B T}{n^2 I_\lambda^2 R^2 L_D^2 R_f} \tag{4}$$

Thermal-Mechanical Noise

Figure 5:
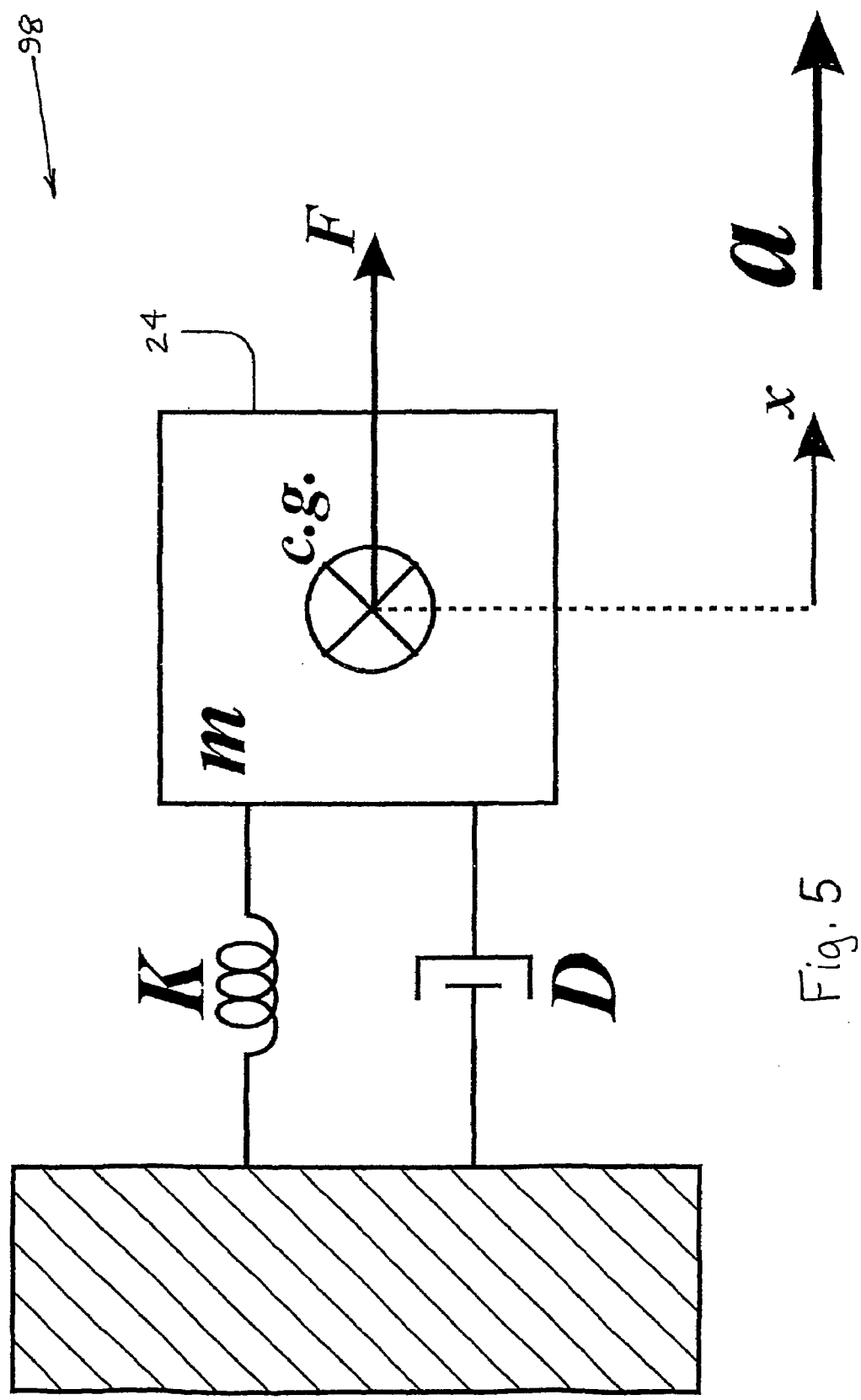
FIG. 5 is a simplified representation of a lumped physical model (mass-spring-damper) illustrating an accelerometer, in accordance with an exemplary embodiment of the present invention.

Now consider the thermal-mechanical noise in exemplary system 40 with one unconstrained degree of freedom, which is a good general representation. A simplified mass-spring-damper representation of the system 70 is shown in FIG. 5. The equation of motion of such a system is given by $$m\ddot{x} + D\dot{x} + Kx = F \tag{5}$$

where m is the mass of proof-mass 24, D is the damping coefficient, K is the stiffness coefficient and F the acting force.

Callen and Greene have shown in their fluctuation-dissipation theorem that an actual spring-mass-damper system can be replaced with an ideal one having fluctuating force noise source acting on the mass with a spectral density of $$S_F = 4 k_B T D \tag{6}$$

By using the Fourier transform on equation (5), the displacement referred thermal-mechanical noise spectral density is derived $$S_x^{TM} = S_F \left|\frac{x}{F}\right|^2 = \frac{8 k_B T}{m} \times \frac{\zeta \omega_n}{(\omega_n^2 - \omega^2)^2 + 4\zeta^2 \omega_n^2 \omega^2}, \tag{7}$$

where $\omega_n = \sqrt{K/m}$ is the natural frequency of system 40, and $\zeta$ is the normalized damping coefficient, where $2\zeta\omega_n = D/m$.

Photodiode Noise

The last noise source to be considered is the photodiode noise. The photodiode noise contribution is divided into the saturation (dark) current noise and the photocurrent noise. Assuming that the saturation current is negligible compared to the photocurrent, the photocurrent noise spectral density $$S_{Idiode} = 4 q I_L, \tag{8}$$

where q is the electron charge and $I_L$ is the total average photocurrent of each of two photodiode arrays 42. Using equations (3) and (8) it can be concluded that as long as $I_L R_f \gg 2 k_B T / q$, the electronic noise is negligible compared with the photocurrent noise. The right hand term of the equation equals ~0.05[V] at room temperature, and thus by proper choice of the feedback resistor this inequality relation is easily achieved.

Using the geometrical parameters from FIGS. 2b and 3b, equation (8) can be rewritten as $$S_{Idiode} = \begin{cases} 4qnW_D L_D I_\lambda R & \text{part-int egration mod } e \\ 4qnW_S L_D I_\lambda R & \text{full-int egration mod } e \end{cases} \quad (9)$$

where $W_D$ is nominal photodiode width 36 in part-integration mode 40a and $W_S$ is the nominal slit width 52 in the full-integration mode 40b.

Employing equation (2), the displacement referred photocurrent noise spectral density is given by $$S_x^{PD} = \frac{q}{P \cdot R} \gamma \text{ and} \quad (10)$$

$$\gamma = \frac{AW_{(D \text{ or } S)}}{nL_D},$$

where P is the total illumination source power and A is illumination spot area 46. In the last derivation assume approximately constant intensity over photodiodes illumination area 46.

Optimal spot size 46, which employs the illumination power to the maximum, encloses grid square 44 and thus has an area of $$A = \frac{\pi}{2} L_D^2.$$

Moreover for a large number of photodiode pairs 58 in each grid, n, and assuming square grid n is approximately given by $$n \cong \frac{L_D}{W_P}$$

where $W_P$ is the period width 60 of the grid. Thus γ is approximately given by $$\gamma \cong \frac{\pi}{2} W_P W_{(D \text{ or } S)}. \quad (11)$$

Therefore, conclude that the displacement referred photocurrent noise is independent of the specific total dimensions of the grid and is only dependent upon the grid period 60 and the nominal slit (in full integration mode 40b) width 52 or nominal diode (in part integration mode 40a) width 36. Thus the grid can be enlarged or reduced in size according to the restrictions of the optical illumination spot size 46. It is apparent to those skilled in the art, that as long as the grid is more dense, i.e. lower period width 60 and lower slit width 52 or diode nominal width 36 accordingly, the sensing limitation is improved.

The Total Noise Equivalent Displacement (TNED)

Consideration is now made of the total noise contribution of micro-system 40. Assuming that electronic readout circuit 32 is properly designed, it is concluded that the total displacement referred noise spectral density is given by $$S_x^{Total} = \frac{q\gamma}{PR} + \frac{8k_B T}{m} \times \frac{\zeta \omega_n}{(\omega_n^2 - \omega^2)^2 + 4\zeta^2 \omega_n^2 \omega^2}.$$

For sensors operating below the natural frequency of the mechanical system, such as the accelerometer, the TNED spectral density at low frequencies is $$S_x^{Total} |_{\omega<<\omega_n} = \frac{q\gamma}{PR} + \frac{8k_B T}{m} \cdot \frac{\zeta}{\omega_n^3}. \quad (12)$$

Figure 4A:
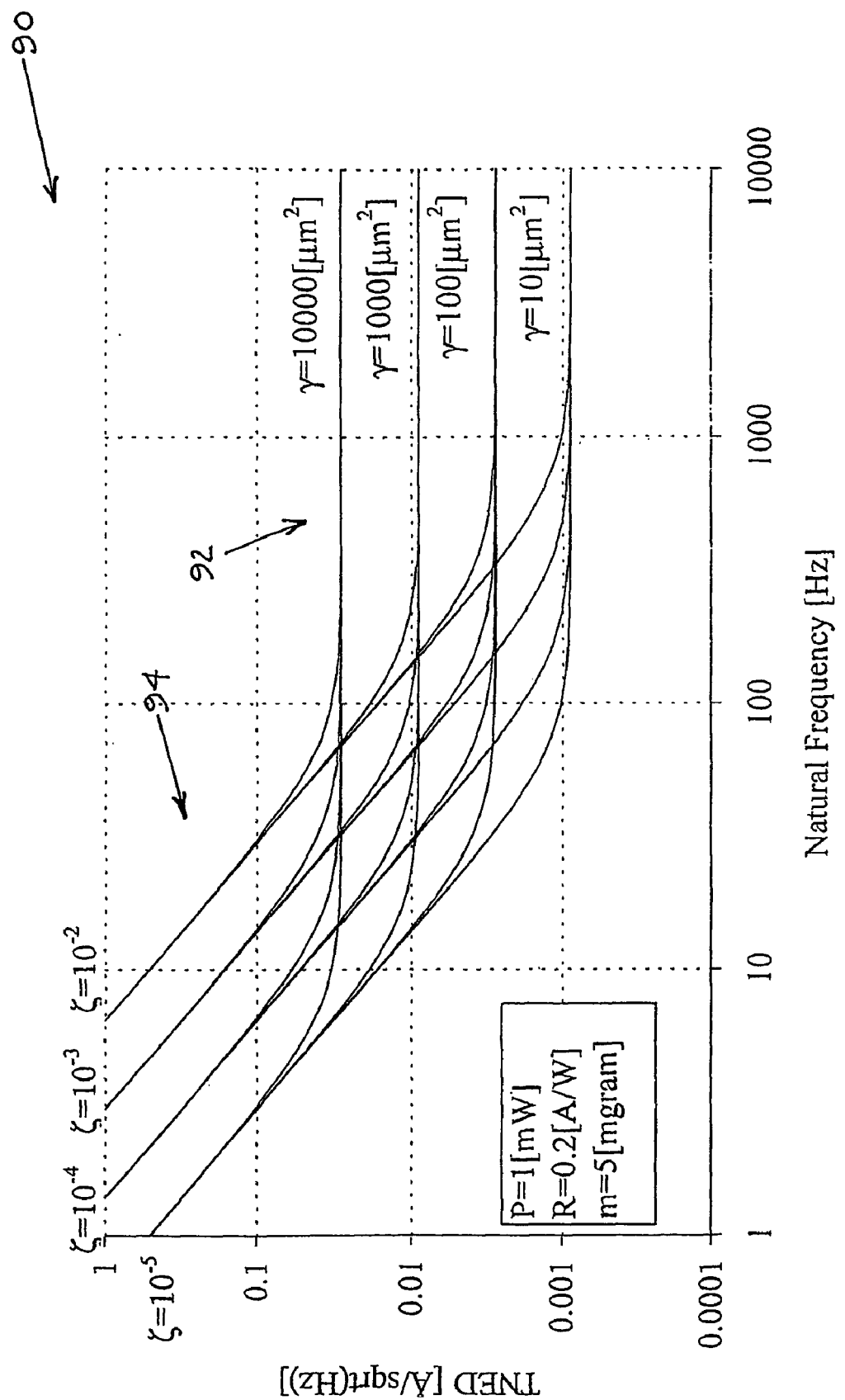
FIG. 4a is a graph of the TNED at low frequencies vs. the natural frequency, illustrating the optical and mechanical dominant regions, in accordance with an exemplary embodiment of the present invention.

FIG. 4a is a graph presenting the TNED at low frequencies vs. the natural frequency, $\omega_n$ 90, for different damping ratios, ζ, and γ factors and for typical values of P, R and a typical proof-mass 24, m, of a mass-produced micro-machined sensor. The figure exhibits two main regions: (1) the optical dominant region at natural frequencies above a few hundred hertz 92 and (2) the mechanical dominant region at natural frequencies below ~10[Hz] 94.

In higher frequency region 92, the TNED is dominated mainly by the photocurrent noise and is only dependent on the γ factor and not the natural frequency, $\omega_n$, or the mechanical damping ratio, ζ, of system 40. It is apparent to those skilled in the art, that for γ factors lower than ~10[μm²] the TNED is lower than $10^{-3}[\_/\sqrt{Hz}]$. γ factors of a few tenths to a hundred can be achieved easily with period width 60, $W_P$, of a few tenths of microns and diode width 36 or silt width 52 of a few microns, resulting in a TNED only slightly higher.

In lower frequency region 94, the thermal-mechanical noise is the main noise source and the TNED increases as the natural frequency is reduced. Nevertheless, since the natural frequency of typical micro-machined sensors 40 is above 100 [Hz], it is assumed that the TNED is mainly dominated by the photocurrent noise and the correction can be estimated using equation (12).

For sensors operating near to the natural frequency of the mechanical system, such as the rate-gyroscope, the TNED can be estimated by $$S_x^{Total} |_{\omega=\omega_n} = \frac{q\gamma}{PR} + \frac{2k_B T}{m} \times \frac{1}{\zeta \omega_n^3}. \quad (13)$$

Thus, the thermal-mechanical noise is increased by the square of the quality factor, Q, where Q=½ζ.

Figure 4B:
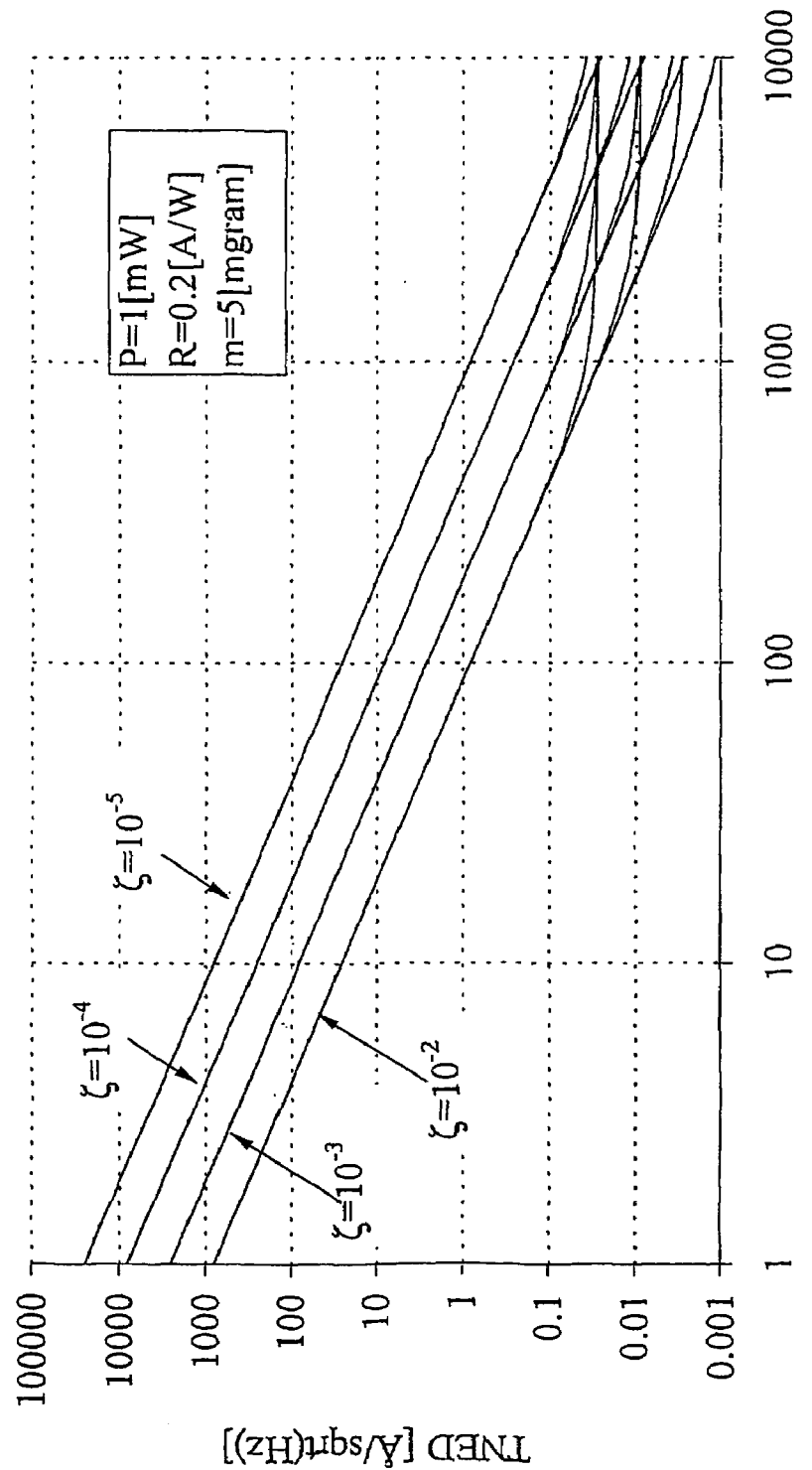
FIG. 4b is a graph of the TNED at low frequencies vs. the natural frequency, illustrating the dominant thermal-mechanical noise, in accordance with an exemplary embodiment of the present invention.

FIG. 4b presents the TNED at the natural frequency vs. the natural frequency, $\omega_n$ 96, for different damping ratios ζ, and γ factors, and for typical values of P, R and a typical proof-mass, m, of a mass-produced micro-machined sensor 40. Unlike the low frequencies case above, in the present case the TNED is dominated by the thermal-mechanical noise over most of the entire range.

Since the typical natural frequencies of micro-machined sensors 40 are in the range of 100[Hz]-10[KHz], at low-frequencies the dominant noise source is the photocurrent noise while at frequencies near the natural frequency the dominant noise source is the thermal-mechanical noise.

The influence of the γ factor on the noise figure at frequencies near the natural frequencies is further discussed hereinbelow at the section entitled Design of a Rate Gyroscope Using EMIDOS.

Design of an Accelerometer Employing EMIDOS

In what follows the design of a novel accelerometer employing EMIDOS is discussed. An accelerometer is a sensor intended for measuring the absolute acceleration of a body in three dimensional space with respect to an inertial frame of reference.

Many designs of micro-machined accelerometers have been reported so far, with one, two or three axes of sensitivity, employing various sensing methods, such as: capacitive, piezoelectric, piezoresistive, thermal, electron tunneling, Bragg grating, MOS strain sensitive and optical.

The typical requirements from micro-machined accelerometers are known in the art for various applications ranging from the automobile industry to inertial navigation. Typical requirements for the automobile application are a noise equivalent acceleration (NEA) of ~1[mg/√Hz] for a bandwidth of 400[Hz], while for inertial navigation the requirements are an NEA of ~1[µg/√Hz] for a bandwidth of 100[Hz].

In the first section hereinbelow, the principle of operation and the dynamic model of a single axis accelerometer are presented. The section thereafter discusses the performance, i.e. the TNEA and the bandwidth, of the same accelerometer. Finally, a case study of a micro-machined accelerometer employing EMIDOS is presented.

Principle of Operation Based on a Dynamic Model

The dynamic model of a single axis accelerometer microsystem is based on the mass-spring-damper lumped model 70, which is presented in FIG. 5. The figure presents a physical model of a system having one degree of freedom (DOF). A proof-mass 24, m, is suspended from a solid frame 74 via a linear spring 76, K. Damping is represented by a viscous linear damper 78, which is denoted by D. Due to linear acceleration, a, of solid frame 74 along the x axis, a displacement, δx, of proof-mass 24 in opposite direction is generated. This displacement is further detected by E-MIDOS apparatus 40.

The equation of motion, which relates the linear acceleration and the displacement, is derived using Newton's second law $$m\delta\ddot{x} + D\delta\dot{x} + K\delta x = -ma. \quad (14)$$

The displacement δx is measured relative to a frame of reference attached to the solid frame and having its origin coinciding with the center of mass 82 (cg) when at equilibrium.

Applying the Fourier transform to equation (14) results in:

$$\frac{\delta \tilde{x}}{\tilde{a}} = -\frac{1}{(\omega_n^2 - \omega^2) + 2j\zeta\omega\omega_n} \quad (15)$$

where $\omega_n$ and $\zeta$ are defined hereinabove.

Performance and Noise Equivalent Acceleration (NEA)

The first parameter of the accelerometer to be discussed is the Total Noise Equivalent Acceleration (TNEA). The TNEA can be derived using the TNED derivation hereinabove, and equation (15), which relates the displacement and induced acceleration. The TNEA spectral density is therefore given by $$S_a = S_x \cdot \left|\frac{a}{\delta x}\right|^2 = \frac{q\gamma}{PR}\left[(\omega_n^2 - \omega^2)^2 + 4\zeta^2\omega^2\omega_n^2\right] + \frac{8k_B T \zeta \omega_n}{m}.$$

Since the operation range of the accelerometer is at frequencies lower than the natural frequency, the TNEA can be approximated in this range by $$S_a = \frac{q\gamma}{PR}\omega_n^4 + \frac{8k_B T \zeta \omega_n}{m}, \quad (16)$$

where the root mean square (RMS) of the TNEA=√(S$_a$'BW), where BW is the effective bandwidth of readout electronics 32.

Equation (16) relates the TNEA with another major parameter of the accelerometer, the natural frequency, which relates to the total bandwidth of the accelerometer. For low damping ratios, ζ, the total bandwidth is about 55% of the natural frequency $\omega_n$.

Equation (16) also emphasizes the advantage of bulk micro-machined accelerometers. The thermal-mechanical noise is reduced as the mass of proof-mass 24, m, is increased. Moreover, it is clearly seen that the TNEA is improved as the natural frequency of the sensor is decreased, either being thermal-mechanical noise dominated, or photocurrent noise dominated.

Figure 6A:
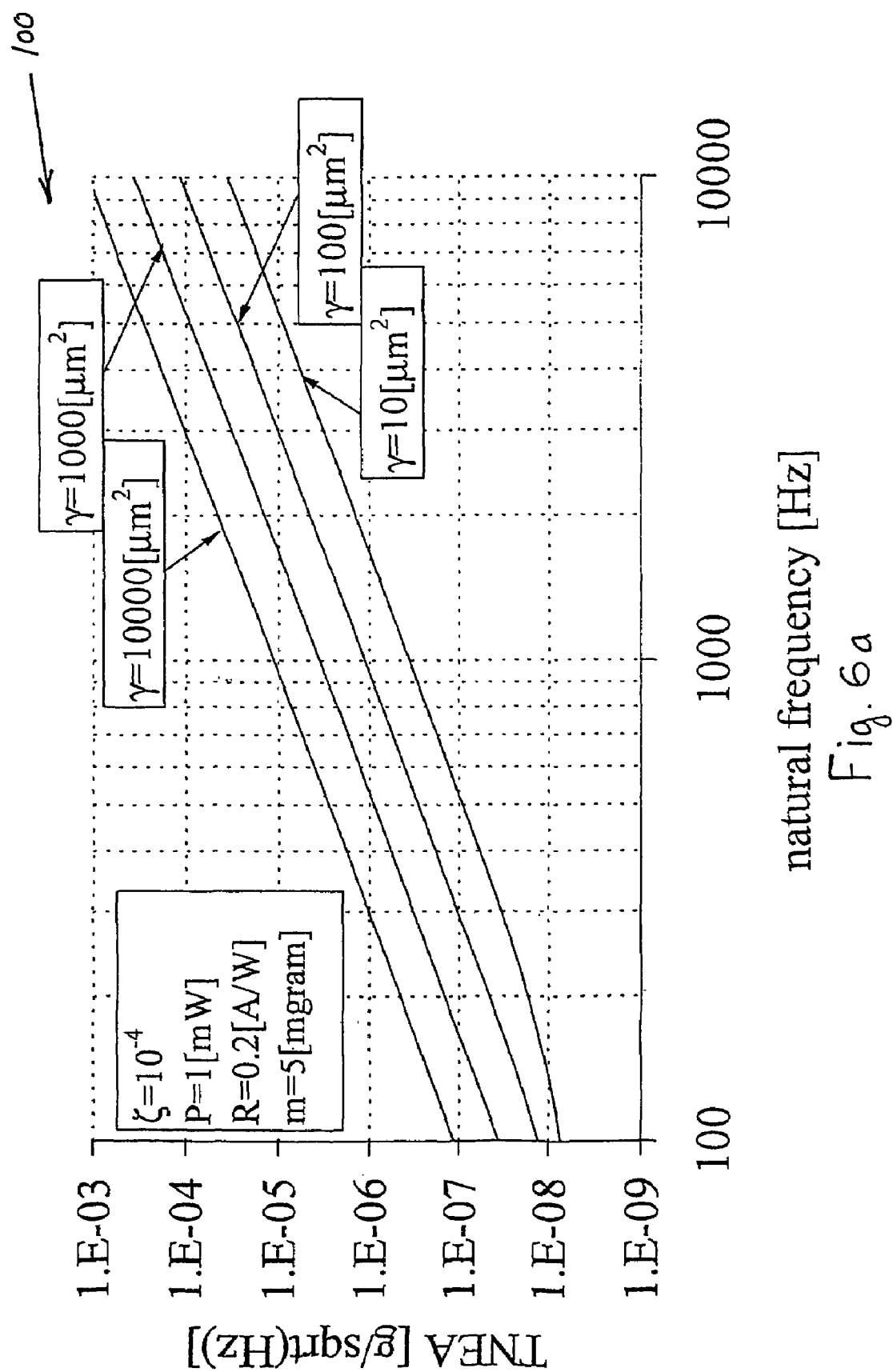
FIG. 6a is a graph of the TNEA of the accelerometer vs. the natural frequency, for different gamma factors, in accordance with an exemplary embodiment of the present invention.

FIG. 6a presents the TNEA of the accelerometer vs. the natural frequency, $\omega_n$, for different γ factors 100. It is clearly shown that for given typical parameters, the TNEA is dominated by the photocurrent noise over the all range of the natural frequencies. The contribution of the thermal-mechanical noise is slightly observed at low natural frequencies for γ=10[µm²]. It is clearly seen that sub-µg accelerometers can be easily realized and even accelerometers with a TNEA of a few ng/√Hz can be realized. This is due to the ability to combine high sensitivity with very low thermal-mechanical noise, i.e. low damping ratio, ζ.

Figure 6B:
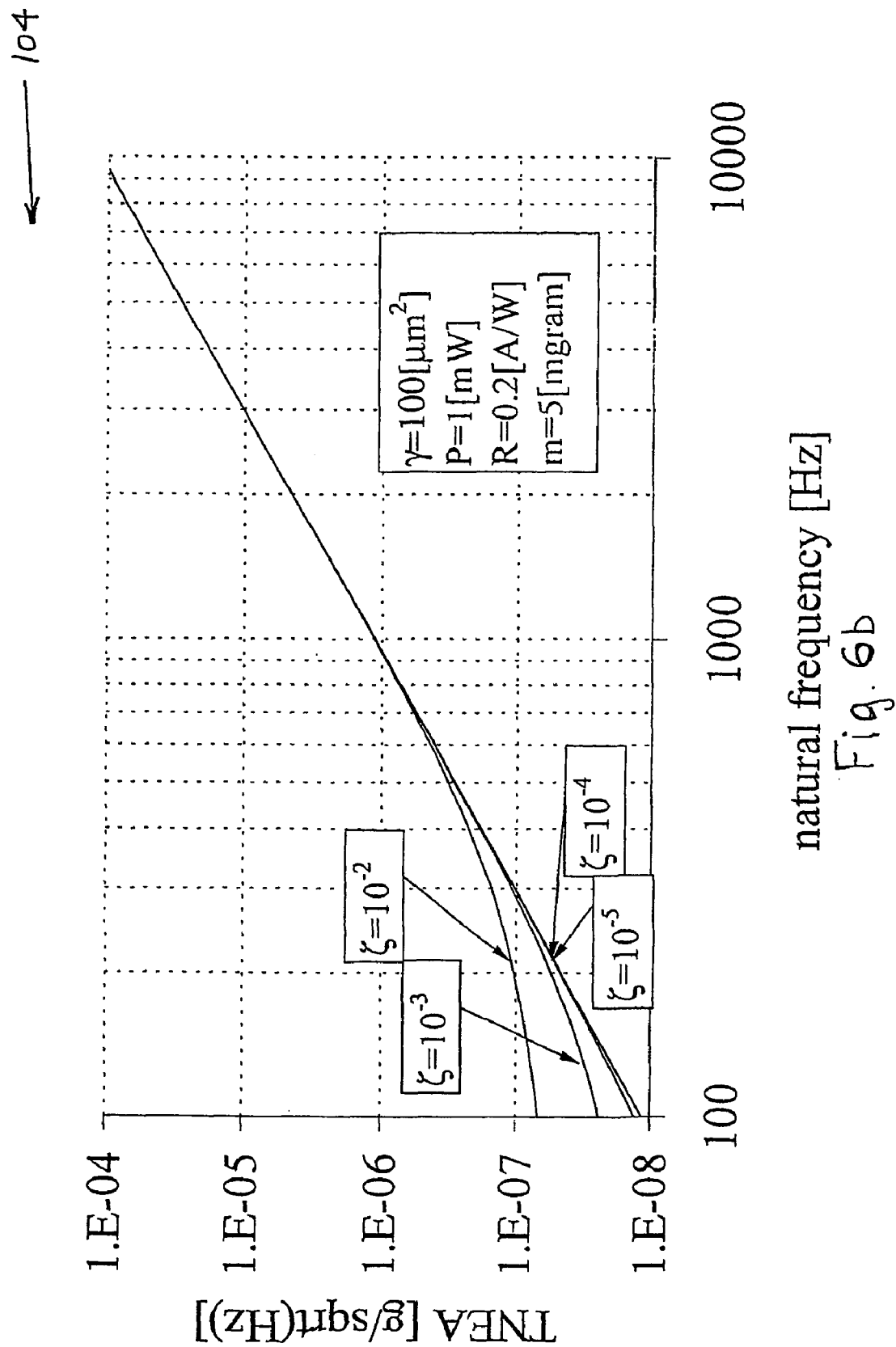
FIG. 6b is a graph of the TNEA of the accelerometer vs. the natural frequency, for different damping ratios factors, in accordance with an exemplary embodiment of the present invention.

FIG. 6b is a graph of the TNEA of the accelerometer vs. the natural frequency, $\omega_n$, for different damping ratios, ζ 104. This figure exhibits the influence of the thermal-mechanical noise and the degradation of the TNEA at low natural frequencies due to higher damping. Nevertheless, sub-µg resolution can be achieved even with higher damping coefficients.

Design Case Study

In the following, a design case study of an accelerometer employing EMIDOS is discussed. The TNEA and natural frequencies are derived for the structure, and the design considerations of the accelerometer are discussed.

Figure 7:
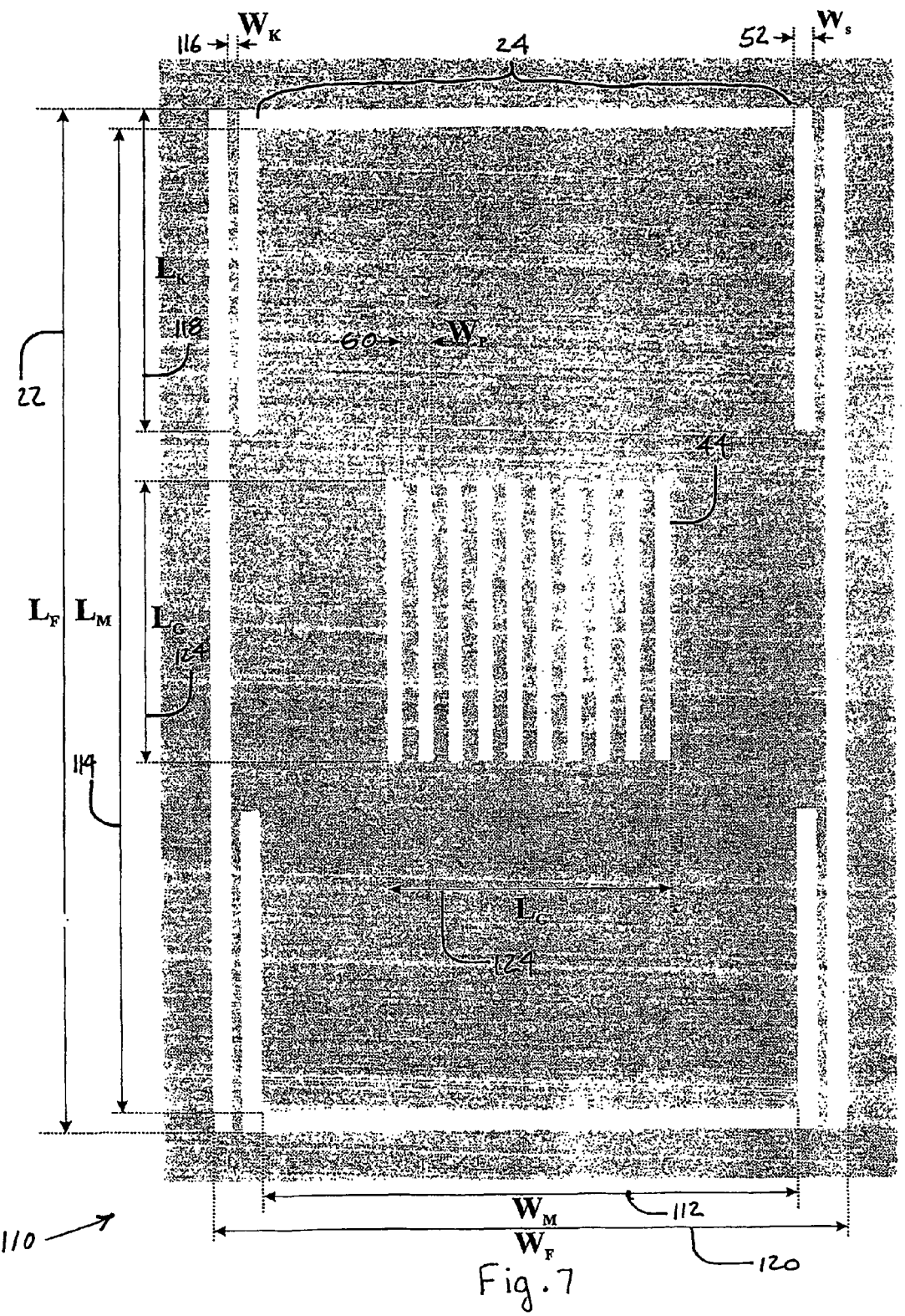
FIG. 7 is a schematic illustration of an accelerometer employing E-MIDOS, in accordance with an exemplary embodiment of the present invention.

FIG. 7 is a schematic illustration of an accelerometer employing E-MIDOS 110, in accordance with an exemplary embodiment of the present invention. The suspending beams and the grid are assumed with rectangular cross-section, see the Fabrication Process, described hereinbelow. The total thickness of all the accelerometer mechanical structural elements, i.e. beams, proof-mass 24 and grid 44, is denoted by T. Grid 44 is centered with respect to proof-mass 24. It is noted that grid 44 does not fill entire proof-mass 24 and mass 24 is extended to fill most of the inner frame. This is done in order to increase the total mass and reduce the thermal-mechanical noise. Grid 44 is circumscribed by, and is not required to be extended over, the entire circumference of illumination spot 46 as was discussed hereinabove in the section entitled Photodiode Noise, and shown therewith in FIG. 3b.

According to the above, the mass and the suspension coefficient of the structure are given by [14]

$$m = \rho T \left[ W_M L_M + 2 \cdot (W_S + W_K)(L_F - 2L_K) - n L_G \frac{W_P}{2} \right] \quad (17)$$

$$K = 4ET \frac{W_K^3}{L_K^3}$$

where $\rho$, E are the mass density and Young's modulus of silicon, $W_M$ and $L_M$ are the proof-mass total width 112 and proof-mass total length 114, respectively, $W_K$ and $L_K$ are the suspension width 116 and suspension length 118, respectively, $W_F$ and $L_F$ are the inner width 120 and length 122 of the fixed frame, respectively, $W_P$ 60 is the grid period, $L_G$ the grid width and length 124, $W_S$ 52 is the general spacing between the mechanical elements, n is the number of slits in the grid. Moreover the following relations prevail $$n = \frac{L_G}{W_P} + \frac{1}{2}$$

$$L_M = L_F - 2W_S$$

$$W_M = W_F - 4W_S - 2W_K$$

Thus the natural frequency of the structure can be calculated using $$\omega_n^2 = \frac{4E}{\rho} \frac{W_K^3}{L_K^3 [(W_F - 4W_S - 2W_K)(L_F - 2W_S) + 2 \cdot (W_S + W_K)(L_F - 2L_K) - \left(\frac{L_G}{W_P} + \frac{1}{2}\right) L_G \frac{W_P}{2}]} \quad (18)$$

and the TNEA can be easily evaluated then using equation (16).

Figure 8A:
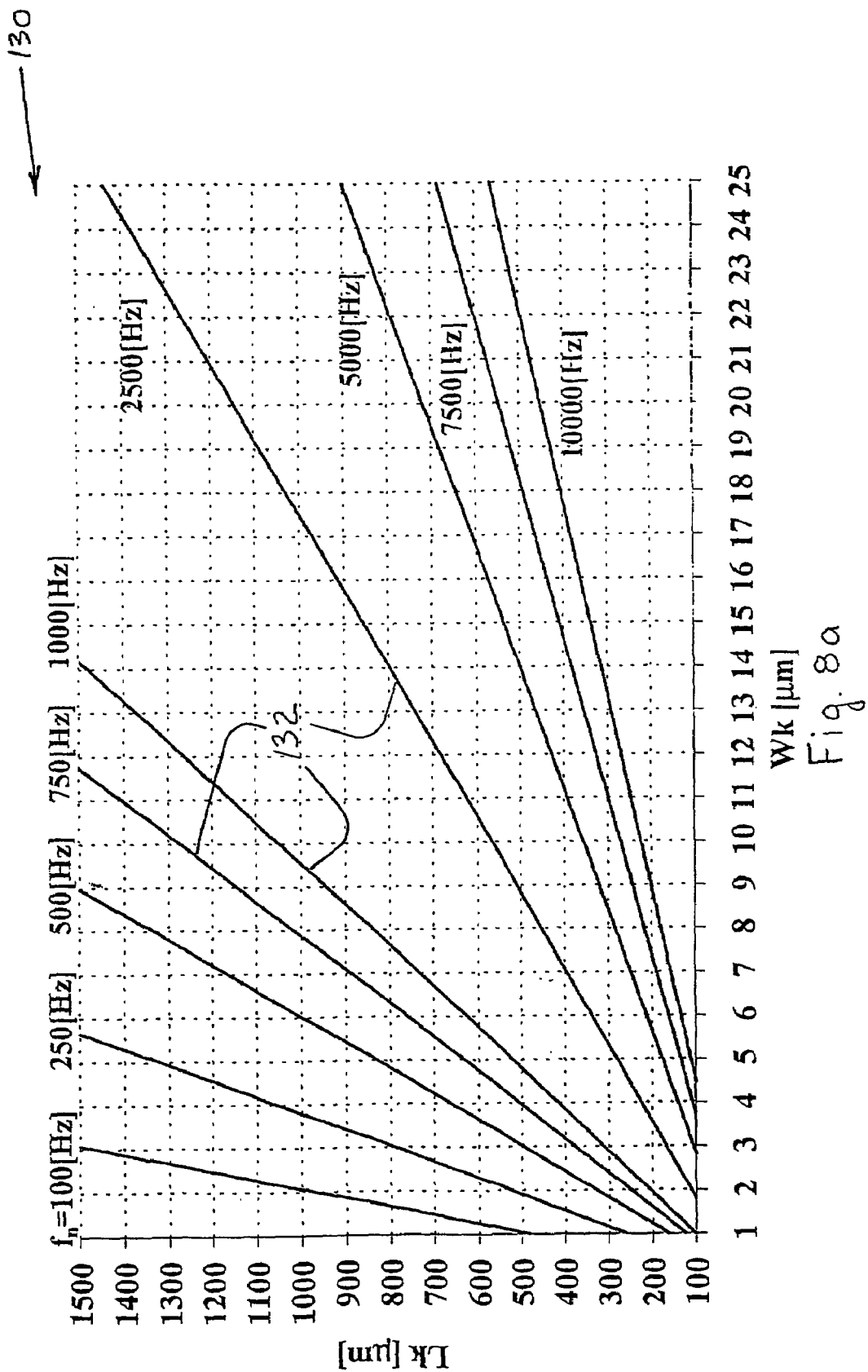
FIG. 8a is a graph of a design chart for an accelerometer in the suspensions' length and width phase plane, in accordance with an exemplary embodiment of the present invention.

FIG. 8a is a graph of a design chart for an accelerometer in the suspensions' length and width phase plane 130, in accordance with an exemplary embodiment of the present invention. Equi-potential lines 132 of the natural frequency are drawn in the chart for the set of parameters summarized in Table I below. Using Table I, the length and width parameters of the beams, as detailed in FIG. 7, can be set for the required natural frequency.

TABLE I

| Parameter | Value |
|---|---|
| Inner frame length - $L_f$ [μm] | 3200 |
| Inner frame width - $W_f$ [μm] | 1700 |
| Structure thickness - T [μ] | 50 |
| Grid length and width - $L_G$ [μm] | 525 |
| Grid period - $W_P$ [μm] | 50 |
| Photodiodes nominal width - $W_D$ [μm] | 2.5 |
| General spacing - Ws [μm] | 25 |
| Young modulus - E [Pa] | $1.31 \times 10^{11}$ |
| Mass density - $\rho$ [Kg/m$^3$] | $2.33 \times 10^3$ |
| Electron charge - q [Coulomb] | $1.6 \times 10^{-19}$ |
| Illumination source power - P [Watt] | $10^{-3}$ |
| Photodiodes responsivity - R [A/W] | 0.2 |
| Thermal energy - $k_B T$ [eV] | 0.026 |

Figure 8B:
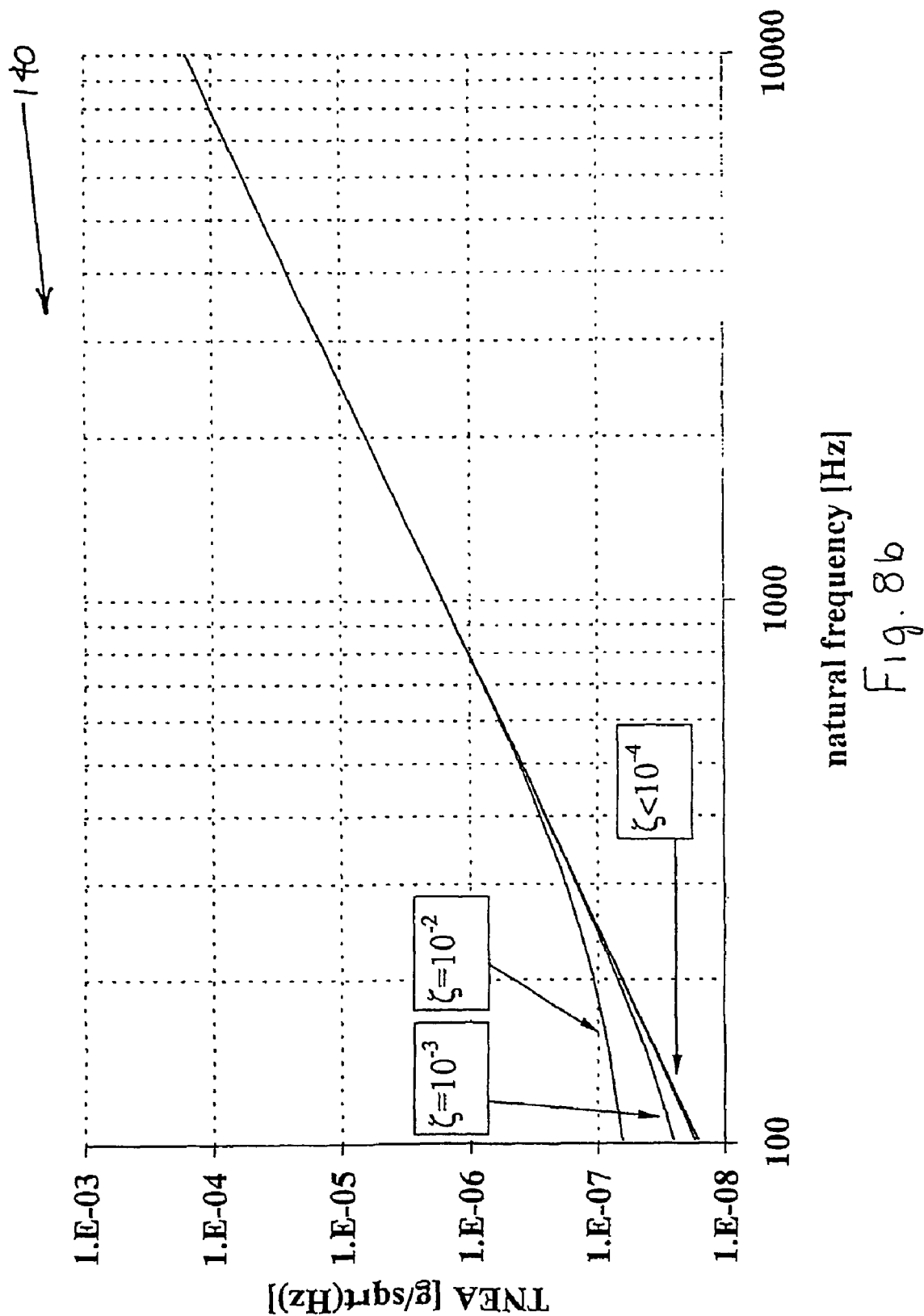
FIG. 8b is a graph of the relation between the TNEA and natural frequency for an accelerometer, in accordance with an exemplary embodiment of the present invention.

FIG. 8b completes the abovementioned chart by illustrating the relation between the TNEA and natural frequency for the current accelerometer design 140. Moreover, FIG. 8b illustrates the change in the TNEA vs. natural frequency for different damping ratios, $\zeta$, i.e. different vacuum levels. By choosing the required TNEA, the natural frequency is set, and by referencing FIG. 8a the geometrical dimensions are completed.

Design of a Rate Gyroscope Employing EMIDOS

In the following section the design considerations of a second inertial sensor, the rate-gyroscope, employing EMIDOS is discussed. A rate gyroscope is a sensor used for measuring the rate of rotation (angular velocity) of a body about a specific body fixed axis.

Micro-machined rate-gyroscopes have a more complex nature than the accelerometers. Most micro-machined gyroscopes are Coriolis Vibratory Gyros (CVG) [15], i.e. based on the Coriolis effect. The Coriolis effect states that if a body has a velocity V with respect to a rotating ($\Omega$) frame of reference, a force equal to the cross product of the rate of the frame and the velocity of the body ($\Omega \times V$) is exerted on the body. A typical micro-machined CVG consists of an elastic body, such that one of its resonant modes (1) is excited to the constant resonant vibration. Inducing a rotational rate about a particular body-fixed axis, excites a different resonant mode (2) into vibration due to the Coriolis effect. The amplitude of the second mode is the measure of the induced rate.

Several actuation methods have been used for driving the first mode (1) into vibration, among which are: electrostatic actuation; electromagnetic actuation; and piezoelectric actuation. The output mode (2) motion has thus far been mainly sensed by either capacitive or piezoresistive methods, however optical as well as tunneling methods have also been reported.

The typical requirements for micro-machined rate-gyroscopes are known in the art, and are divided into three grades: rate grade, tactical grade and navigation grade. Typical requirements for the rate grade are a noise equivalent rate (NER) of >30[deg/hr/$\sqrt{Hz}$], for a bandwidth of 70[Hz]; for the tactical grade are an NER of >3[deg/hr/$\sqrt{Hz}$] for a bandwidth of 100[Hz], and for the navigation grade an NER of <0.05[deg/hr/$\sqrt{Hz}$] for a bandwidth of 100[Hz].

In the first section to follow the principle of operation and the dynamic model of a single axis de-coupled mode rate-gyroscope are presented. The second section discusses the performance, mainly the TNER, of the presented rate-gyroscope. Finally, a case study of a micro-machined rate-gyroscope employing EMIDOS is presented.

Figure 9:
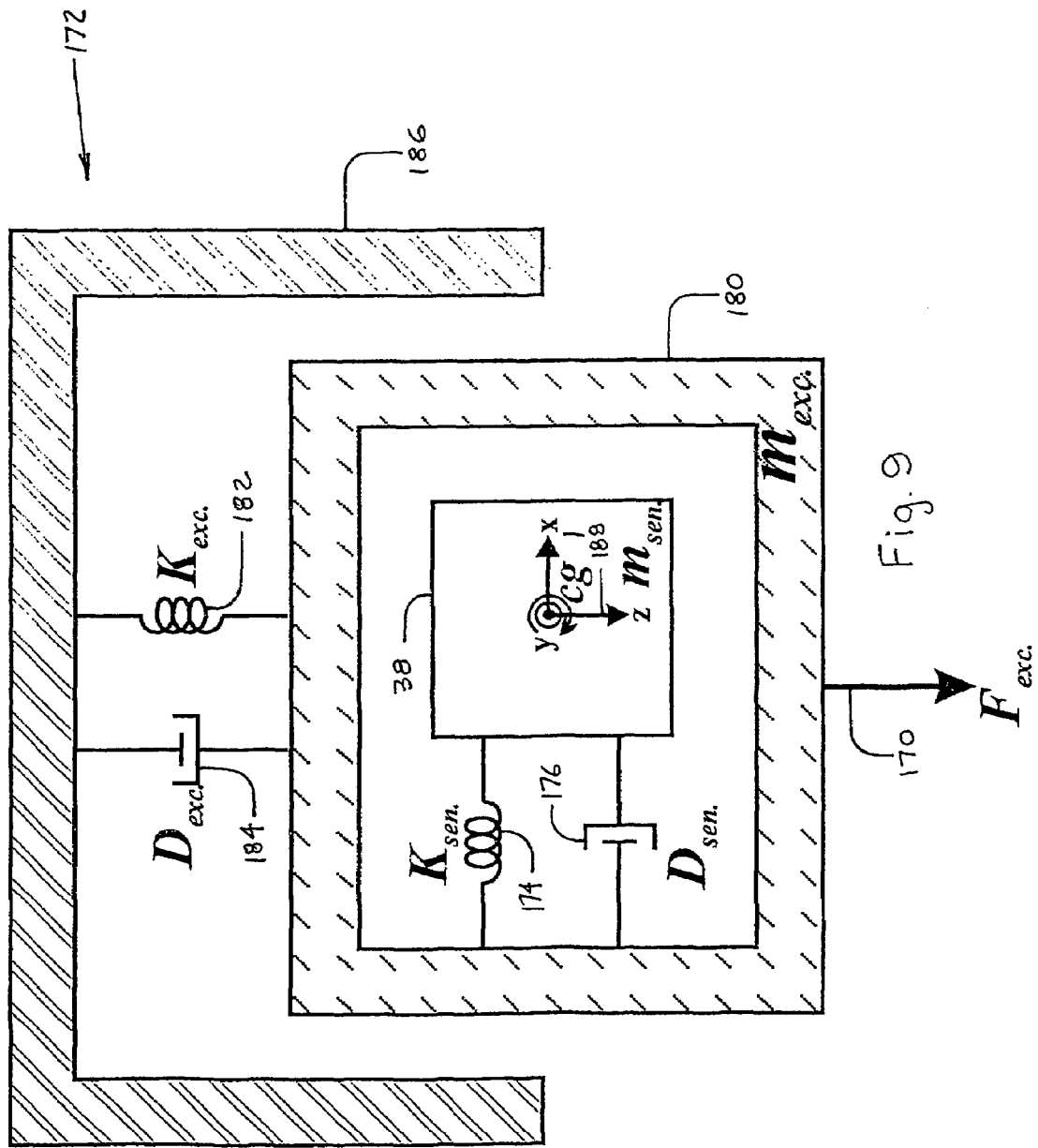
FIG. 9 is a simplified representation of a lumped physical model (mass-spring-damper) illustrating a decoupled mode CVG, in accordance with an exemplary embodiment of the present invention.

Principle of Operation and Dynamic Model of a Single Axis De-coupled Mode Rate Gyroscope FIG. 9 illustrates a lumped physical model (mass-spring-damper) of a de-coupled mode CVG 172. Therein, an inner sensor mass 38 is suspended via linear spring 174 and damper 176 to a second outer excitation mass 180, which is further suspended via a second set of linear spring 182 and damper 184 to a solid frame 186. (x,y,z) is a Cartesian frame of reference that is fixed relative to the solid frame. The y-axis is perpendicular to the x-z plane 188 of CVG illustration 172. When at rest, the origin of axes coincides with the center of mass of the inner mass—cg 190.

The second set of linear spring 182 and damper 184 confine outer mass 180 displacements to a linear motion along the z-axis. Inner mass 38 is assumed to move with outer mass 180 along the z-axis, i.e. an infinite stiffness is assumed between the inner and outer masses in the z-direction. The relative displacements of inner mass 38 with respect to outer mass 180 are confined to a linear motion along the x-axis. The absolute angular velocity of the solid frame, $\Omega_Y$, is assumed about the y-axis.

Outer mass 180 is excited into vibrations via an excitation force $F_{exc}$ 170 in the z-direction. Thus, inner-mass 38 is excited into the same vibrations as outer mass 180 in the z-direction since they move together therewith. Due to angular velocity about the y-axis a Coriolis force is exerted on both masses in the x-direction. Since only inner-mass 38 can move along the x-axis, only inner mass 38 vibrates in the x-direction as a result of the Coriolis force. These vibrations are resolved by the E-MIDOS and are a measure of the rate.

A thorough analysis of a vibrating rate gyroscope assumes low and constant rate, whereby the following equations of motion are derived [9]

$$\delta\ddot{x} + 2\zeta_x\omega_{nx}\delta\dot{x} + \omega_{nx}^2\delta x = -2\Omega_y\delta\dot{z} \qquad (19)$$

$$\delta\ddot{z} + 2\zeta_z\omega_{nz}\delta\dot{z} + \omega_{nz}^2\delta z = \frac{F_{exc}}{m_{exc} + m_{sen}}$$

where: $\delta x$ is the displacement of inner mass 38 along the x-axis of the Cartesian frame; $\delta z$ is the displacement of inner-mass 38 (and outer-mass 140) along the z-axis of the Cartesian frame; $\omega_{nx} = K_{sen}/m_{sen}$ is the output natural frequency; $\zeta_x = D_{sen}/(2\omega_{nx}\cdot m_{sen})$ is the output damping ratio; $\omega_{nz} = K_{exc}/(M_{exc}+m_{sen})$ is the excitation natural frequency; $\zeta_z = D_{exc}/[2\omega_{nz}\cdot(m_{sen}+m_{exc})]$ is the excitation damping ratio; and $F_{exc}$ is excitation force 170, which is assumed to be sinusoidal with an excitation frequency denoted by $\omega$.

Using the Fourier transform, the following is derived $$|\delta\tilde{x}| = \frac{2\omega\Omega y}{\sqrt{(\omega_{nx}^2 - \omega^2)^2 + 4\zeta_x^2\omega_{nx}^2\omega^2}}|\delta\tilde{z}| \qquad (20)$$

$$|\delta\tilde{z}| = \frac{1}{\sqrt{(\omega_{nz}^2 - \omega^2)^2 + 4\zeta_z^2\omega_{nz}^2\omega^2}}|\tilde{a}_{exc}|$$

where $|\delta\tilde{x}|$, $|\delta\tilde{z}|$ are the output and excitation amplitudes, respectively, and $|\tilde{a}_{exc}| = |\tilde{F}_{exc}|/(m_{exc}+m_{sen})$ is the excitation acceleration amplitude.

It is easily derived by one skilled in the art, from equation (20) that for a given excitation 170 amplitude the maximal response occurs at $\omega = \omega_{nx}$. For the excitation amplitude it is clearly seen that for low damping ratios and constant excitation force amplitude the maximal excitation amplitude occur at $\omega \approx \omega_{nz}$. Thus, it is obvious that the best response of the rate-gyroscope is when $\omega \approx \omega_{nx} \approx \omega_{nz}$.

In order to maintain a constant relation between the output amplitude and rate, it is highly important to maintain and control the excitation frequency and excitation amplitude 170 constant. Techniques to achieve this control usually maintain the excitation frequency at the excitation natural frequency and the excitation amplitude constant. Nevertheless, due to bandwidth requirements and fabrication tolerances, some deviation occurs in the excitation and output natural frequencies, which results in lower output response. It is therefore assumed in the following derivations that the excitation frequency is the excitation natural frequency and that the excitation amplitude is constant and examination is made of the influence of the deviation occurring in the natural frequencies.

The Noise Equivalent Rate (NER)

The total noise equivalent rate (TNER) can be derived using the TNED derivation from section on Photodiode Noise and equation (20), assuming constant excitation amplitude, the TNER spectral density is given by, $$S_\Omega = S_x\left|\frac{\Omega}{x}\right|^2 = \frac{q\gamma}{PR}\frac{(\omega_{nx}^2 - \omega^2)^2 + 4\zeta_x^2\omega_{nx}^2\omega^2}{4\omega^2|\delta\tilde{z}|^2} + \frac{2k_B T\zeta_x\omega_{nx}}{m_{sen}\omega^2|\delta\tilde{z}|^2} \qquad (21)$$

where the RMS of the TNER=$\sqrt{(S_\Omega\cdot BW)}$, and where BW is the effective bandwidth of readout electronics 32.

Figure 10A:
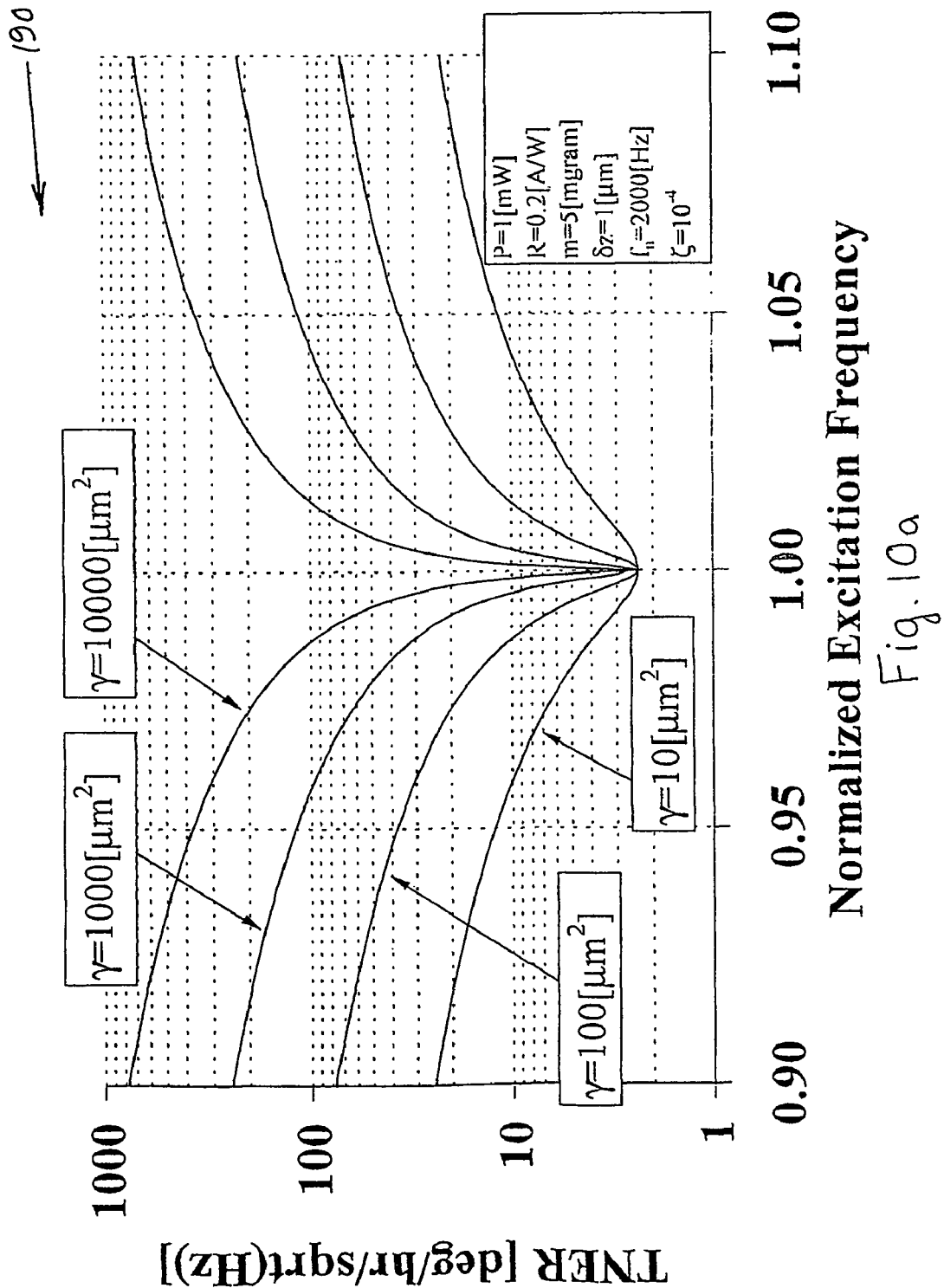
FIG. 10a is a graph of the TNER vs. the normalized excitation frequency for different gamma factors, in accordance with an exemplary embodiment of the present invention.

FIG. 10*a* is a graph of the TNER vs. the normalized excitation frequency for different $\gamma$ (gamma) factors and typical parameters 190, in accordance with an exemplary embodiment of the present invention.

Figure 10B:
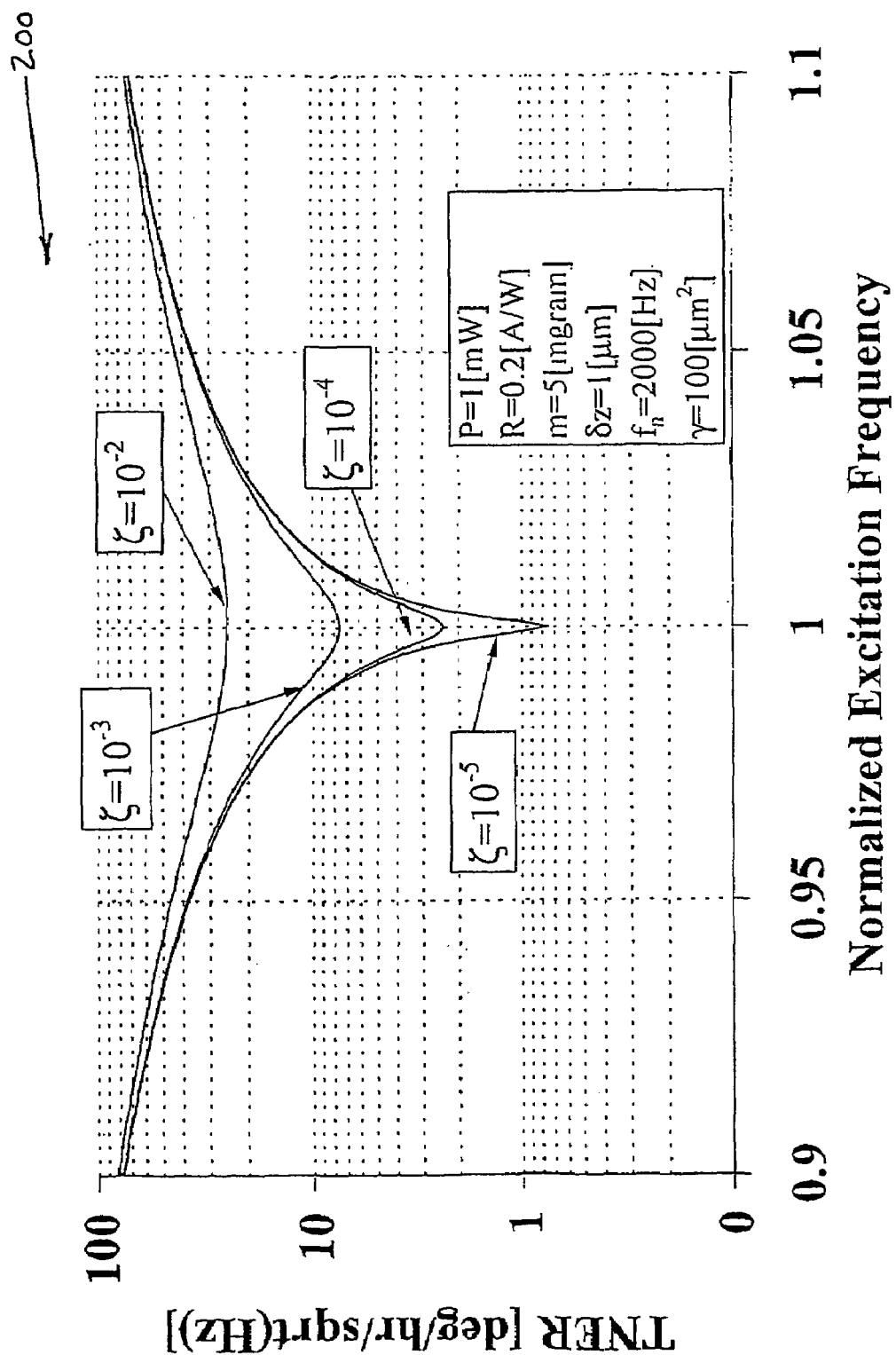
FIG. 10b is a graph of the TNER vs. the normalized excitation frequency for different zeta factors, in accordance with an exemplary embodiment of the present invention.

FIG. 10*b* is a graph of the TNER vs. the normalized excitation frequency for different $\zeta_x$ (zeta) factors and typical parameters 200, in accordance with an exemplary embodiment of the present invention. The excitation frequency is normalized by the output natural frequency. Since the excitation frequency is the excitation natural frequency, as was discussed in section Principle of Operation and Dynamic Model of a Single Axis De-coupled Mode Rate Gyroscope, FIGS. 10*a* and 10*b* actually illustrate the dependency of the TNER on the deviation between the two natural frequencies. It is assumed that excitation amplitude 170 can be maintained constant in the discussed frequency range. Since excitation amplitude 170 is quite limited around the natural frequency, this can be achieved by only a slight change in the applied force of excitation amplitude 170.

Several conclusions can be derived from FIG. 10*a* and FIG. 10*b*:

(1) A resolution of few deg/hr is easily achievable using moderate damping ratios ($10^{-3}$–$10^{-4}$), moderate excitation amplitude (~1 µm) and a deviation of a few percent between the natural frequencies. More demanding requirements (i.e. $\zeta_x$~$10^{-5}$, $\delta z$~10 µm, $\omega_{nx}=\omega_{nz}$) results in a TNER<0.1[deg/hr/$\sqrt{Hz}$].

(2) At the output natural frequency the dominant noise source is the thermal mechanical noise.

(3) The best TNER is achieved at $\omega = \omega_{nz} = \omega_{nx}$, i.e. at zero deviation between the natural frequencies, where $$S_\Omega = \Big|_{\omega=\omega_{nx}=\omega_{nz}=\omega_O} = \frac{1}{|\delta\tilde{z}|^2}\left[\frac{q\gamma}{PR}\zeta_x^2\omega_n^2 + \frac{2k_B T\zeta_x}{m_{sen}\omega_n}\right] \qquad (22)$$

(4) Lowering the $\gamma$ factor does not improve the best TNER, but reduces the sensitivity to the deviation between the natural frequencies. While for high $\gamma$ factor (~10000 µm²)

the TNER degrades by two orders of magnitude for a 3–4% deviation, for low γ factor (~10 μm²) the TNER is reduced only by a factor of 4–5 for the same deviation. This reduces the sensitivity to fabrication tolerances and allows better control on the deviation and bandwidth.

The first term in equation (22), which is related to the photocurrent noise, increases with the natural frequency. The second term, which is related to the thermal mechanical noise, decreases with the natural frequency. This may imply an optimal natural frequency for the TNER at $$\omega_n = \sqrt[3]{\frac{k_B T}{q} \frac{1}{\zeta_x m_{sen}} \frac{PR}{\gamma}}$$

Nevertheless, it should be noted that the last is true when maintaining the excitation amplitude constant over the entire range. This of course can be done at the expense of applied force 170.

Figure 10C:
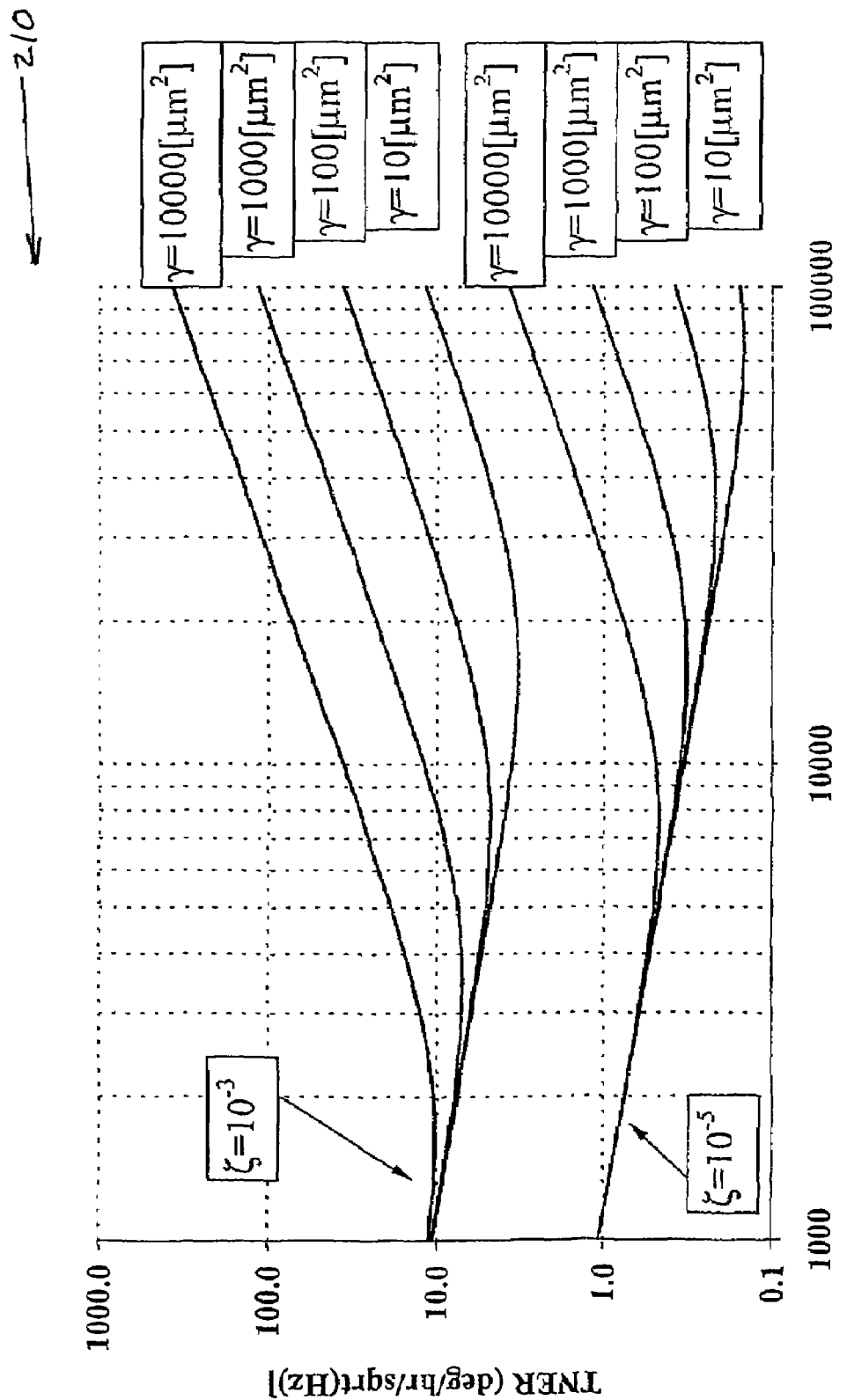
FIG. 10c is a graph of the TNER vs. the natural frequency for a constant excitation amplitude, in accordance with an exemplary embodiment of the present invention.

FIG. 10c is a graph of the TNER from equation (22) vs. the natural frequency for a constant excitation amplitude 210, in accordance with an exemplary embodiment of the present invention. It can be seen that as the γ factor or the damping ratio $\zeta_x$, are decreased, the optimal TNER is improved, but shifted to higher natural frequencies. Moreover, it is seen that below the optimal natural frequency, the TNER is thermal-mechanical noise dominated, while above it the TNER is photo-current noise dominated.

Design Case Study of a Rate-Gyroscope Employing EMIDOS

The TNER and natural frequencies are derived for the structure and the design considerations of the rate-gyroscope are now discussed.

Figure 11:
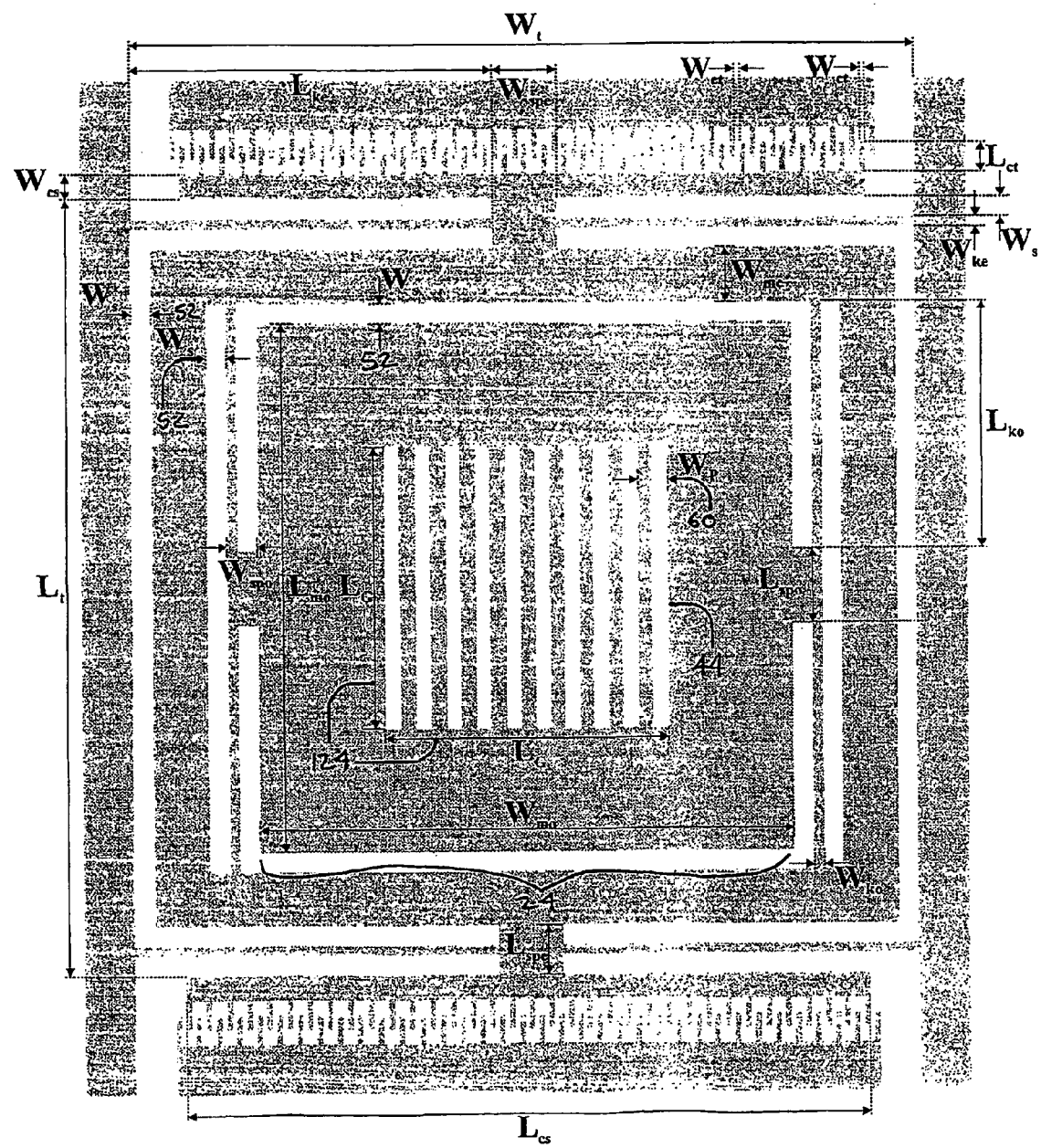
FIG. 11 is a schematic illustration of a rate-gyroscope employing E-MIDOS, in accordance with an exemplary embodiment of the present invention.

A schematic illustration of the rate-gyroscope 220 is shown in FIG. 11, in accordance with an exemplary embodiment of the present invention. The suspending beams and the grid are assumed with rectangular cross-section, as described hereinbelow in the discussion of the fabrication process. The total thickness of the rate-gyroscope mechanical structure, i.e. beams, proof-mass 24 and grid 44, is denoted by T. Grid 44 is centered with respect to the inner proof-mass.

Table II summarizes the design parameters for the rate-gyroscope.

TABLE II

| Parameter | Value |
| --- | --- |
| Total structure length - $L_t$ [μm] | 2800 |
| Total structure width - $W_t$ [μm] | 1700 |
| Structure thickness - T [μm] | 50 |
| Excitation frame width - $W_{me}$ [μm] | 100 |
| Grid length and width - $L_G$ [μm] | 525 |
| Grid period - $W_P$ [μm] | 50 |
| Photodiodes nominal width - $W_D$ [μm] | 2.5 |
| General spacing - Ws [μm] | 10 |
| Comb Drive support length - $L_{cs}$ [μm] | 1665 |
| Comb Drive support width - $W_{cs}$ [μm] | 50 |
| Comb Drive teeth length - $L_{ct}$ [μm] | 100 |
| Comb Drive teeth width - $W_{ct}$ [μm] | 5 |
| Young modulus - E [Pa] | $1.31 \times 10^{11}$ |
| Mass density - ρ [Kg/m³] | $2.33 \times 10^3$ |
| Electron charge - q [Coulomb] | $1.6 \times 10^{-19}$ |
| Illumination source power - P [Watt] | $10^{-3}$ |
| Photodiodes responsivity - R [A/W] | 0.2 |
| Thermal energy - $k_B T$ [eV] | 0.026 |

Figure 12A:
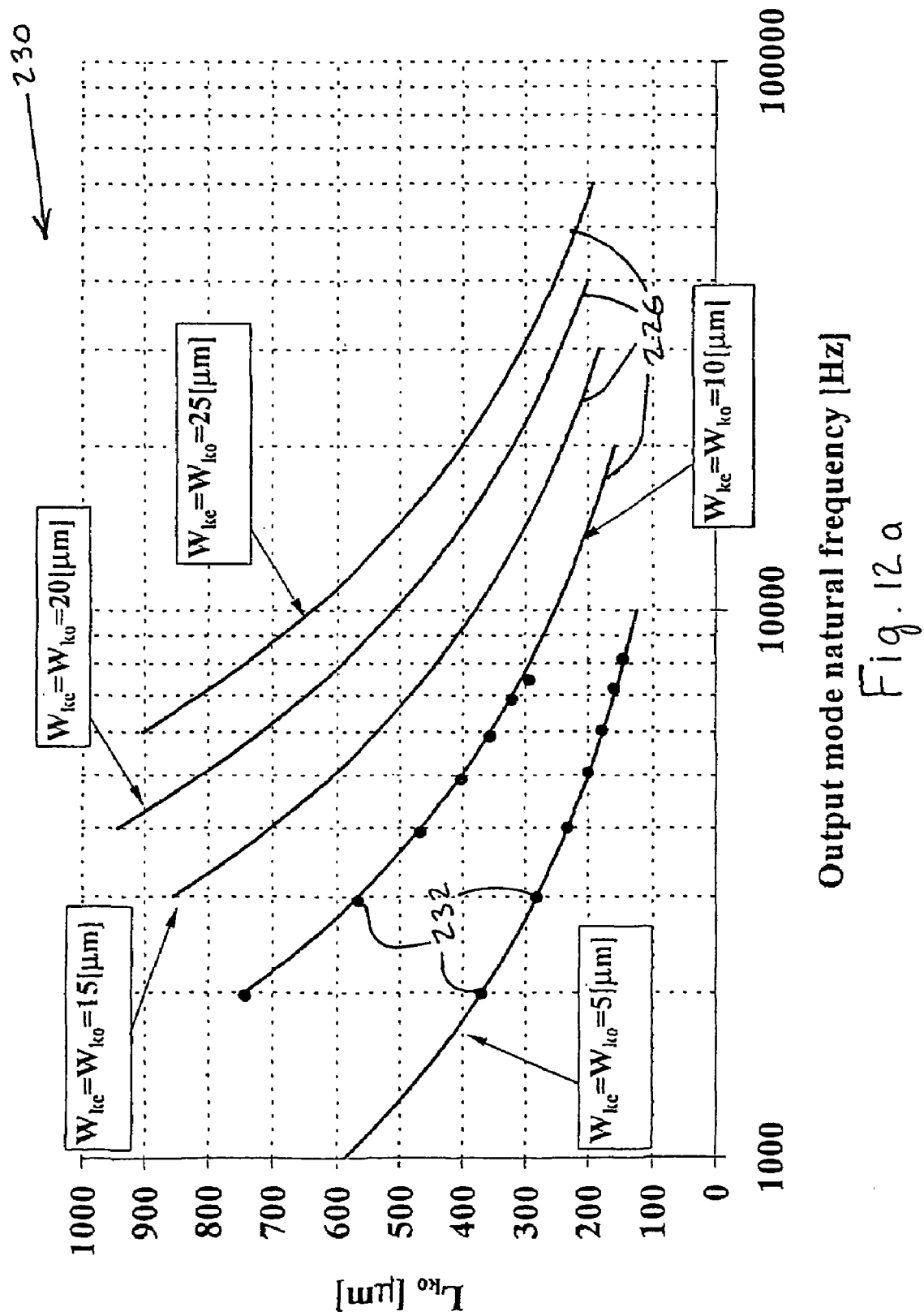
FIG. 12a is a graph of a design chart for the rate-gyroscope illustrating the sensing mode suspensions length vs. the required natural frequency for various suspensions widths, the bold dots are derived from finite element results, in accordance with an exemplary embodiment of the present invention.
Figure 12B:
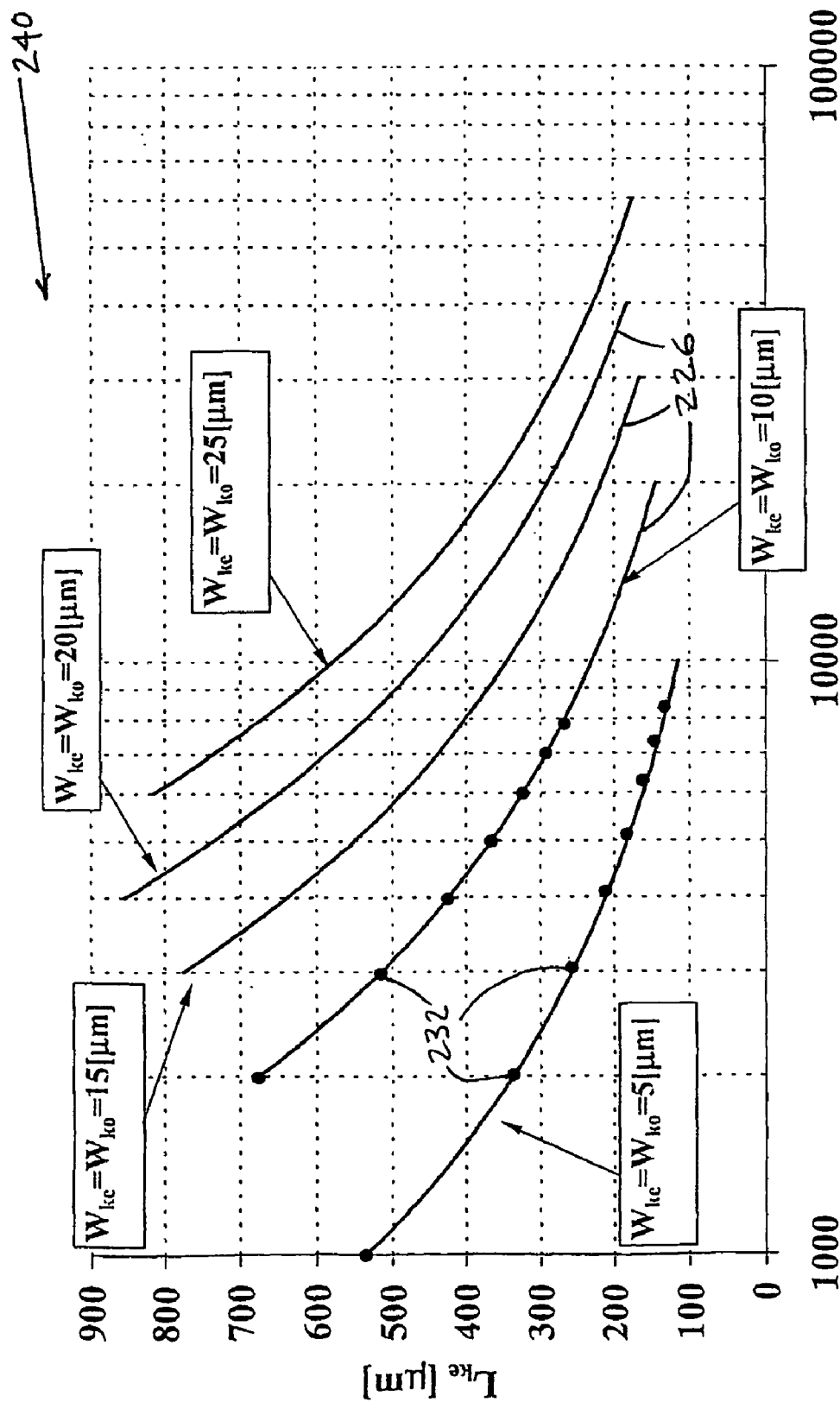
FIG. 12b is a graph of a design chart for the rate-gyroscope illustrating the excitation mode suspensions length vs. the required natural frequency for various suspensions widths, the bold dots are derived from finite element results, in accordance with an exemplary embodiment of the present invention.
Figure 12C:
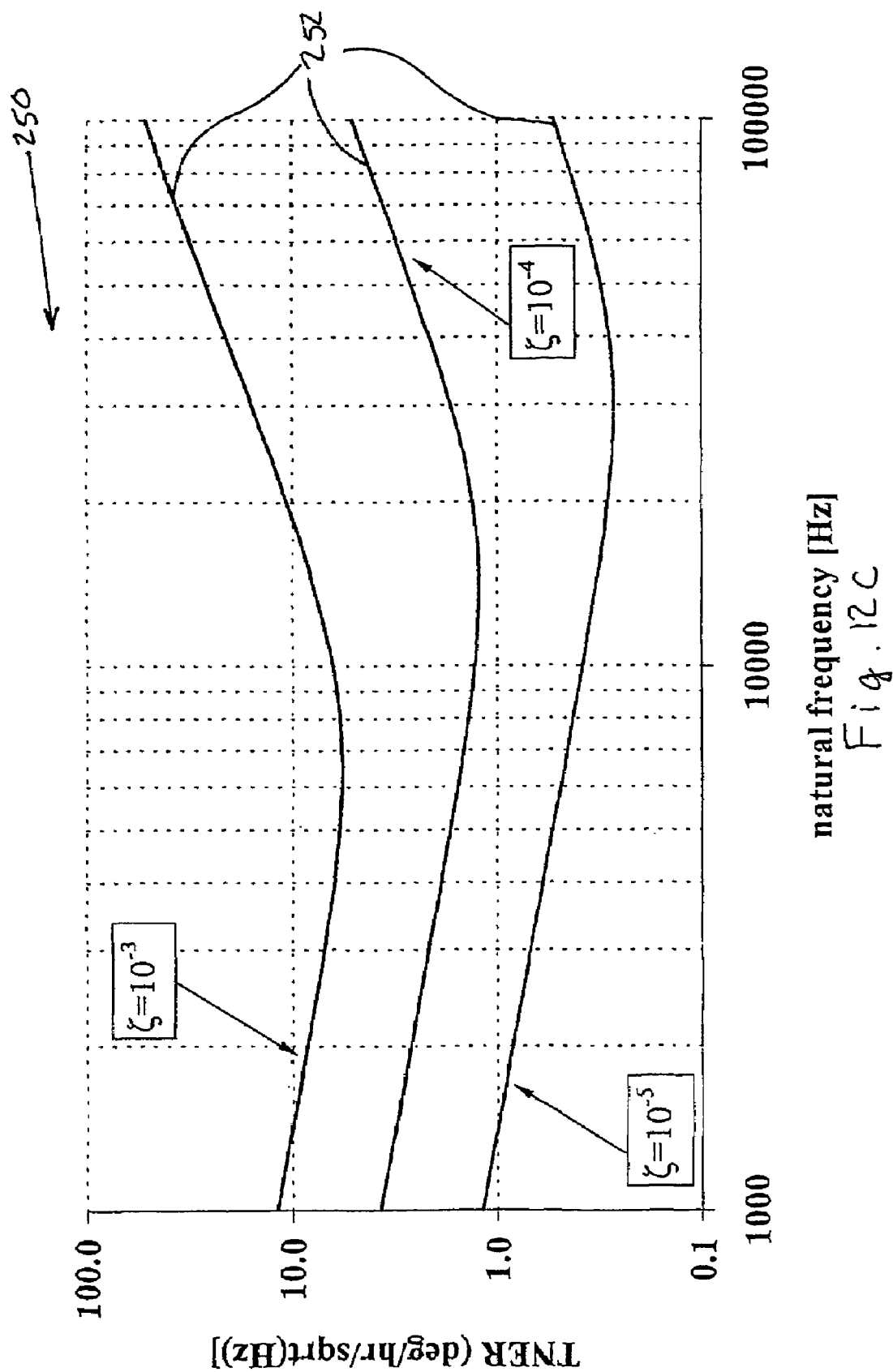
FIG. 12c is a graph of the relation of the TNER of the rate-gyroscope at no-split vs. the natural frequency, in accordance with an exemplary embodiment of the present invention.

FIGS. 12a, 12b and 12c are the dimension design charts for the rate-gyroscope, in accordance with an exemplary embodiment of the present invention. FIGS. 12a and 12b graphically illustrate the calculated length of the pairs of suspensions vs. the required natural frequency for several suspensions widths 226.

FIG. 12a is the output sensing mode suspensions length vs. the required natural frequency 230 for several suspension widths.

FIG. 12b is the excitation mode suspensions length vs. the required natural frequency 240 for several suspension widths.

FIG. 12c is a graphical representation of the TNER of the rate-gyroscope at no-split vs. the natural frequency 250. These three accelerometer design charts in combination with TABLE II can be used for setting the dimensions of the designed rate-gyroscope for preferred TNER. The bold dots 232 in FIGS. 12a and 12b are finite-elements results of the natural frequencies, which are also summarized in TABLE III. FIG. 12c shows results for several values 252 of normalized damping coefficient ζ. TABLE II summarizes the set of parameters used in these calculations. FIG. 12c presents the calculated TNER for zero split vs. the natural frequency for the discussed case study. The three figures can be used as design charts for the gyro by choosing the natural frequency from FIG. 12c and the suspensions dimensions from FIGS. 12a and 12b.

Figure 13A:
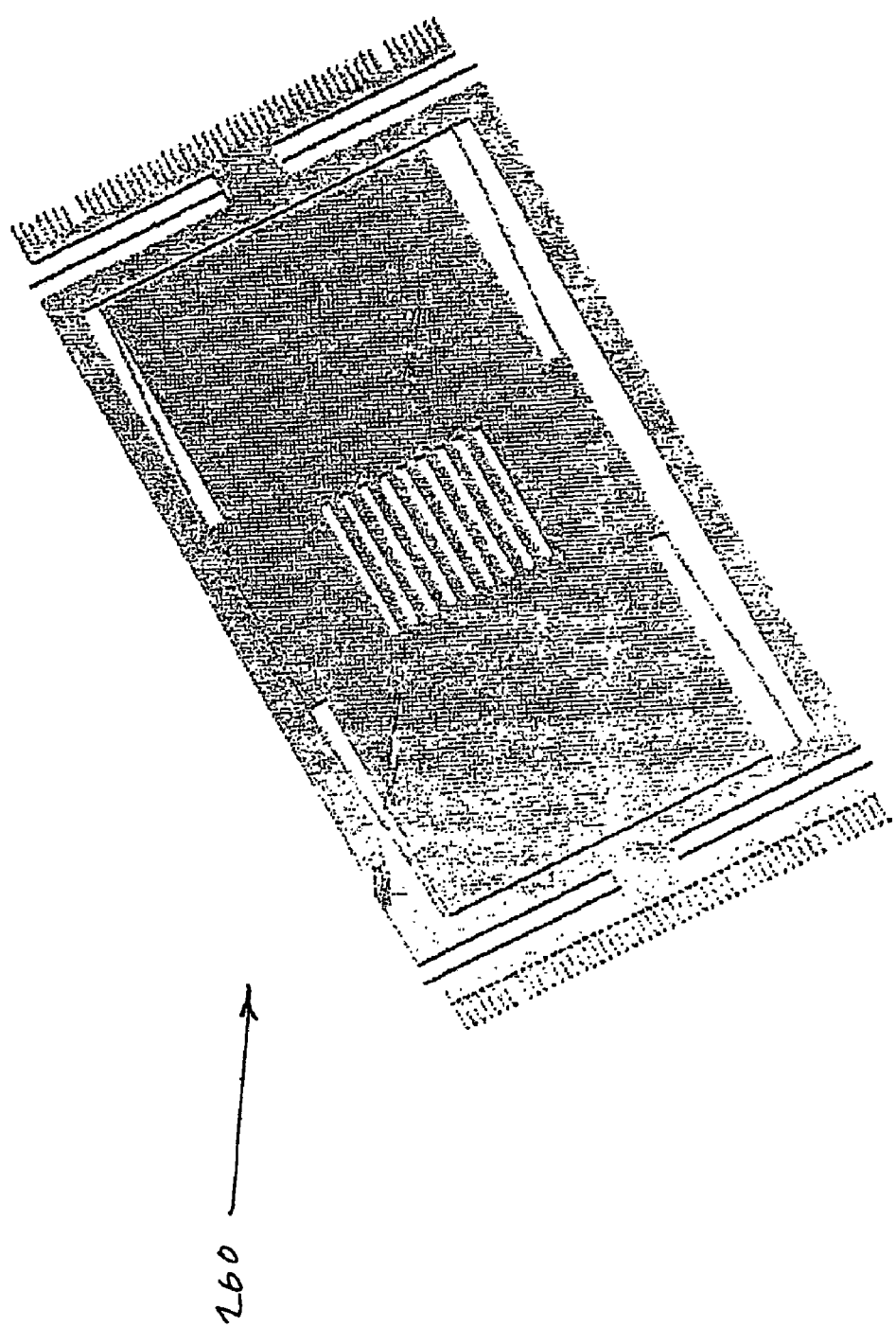
FIG. 13a is a schematic illustration of the first of three modes of the rate-gyroscope case study derived from finite element results, i.e., the output sensing mode, in accordance with an exemplary embodiment of the present invention.

FIG. 13a is a schematic illustration of the first of three modes of the rate-gyroscope case study derived from finite element results, i.e., the output sensing mode 260, in accordance with an exemplary embodiment of the present invention.

Figure 13B:
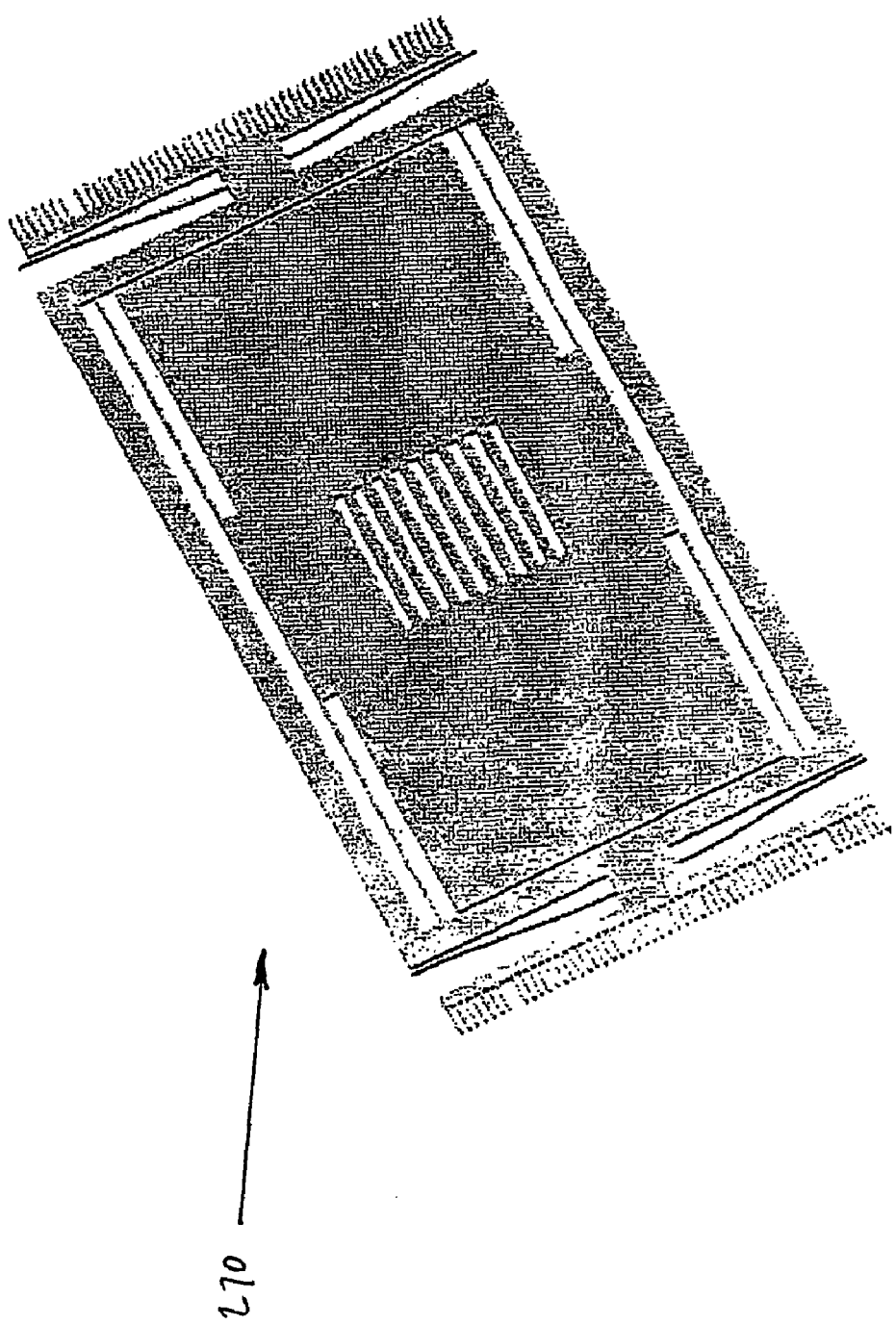
FIG. 13b is a schematic illustration of the second of three modes of the rate-gyroscope case study derived from finite element results, i.e., the excitation mode, in accordance with an exemplary embodiment of the present invention.

FIG. 13b is a schematic illustration of the second of three modes of the rate-gyroscope case study derived from finite element results, i.e., the excitation mode 270, in accordance with an exemplary embodiment of the present invention.

Figure 13C:
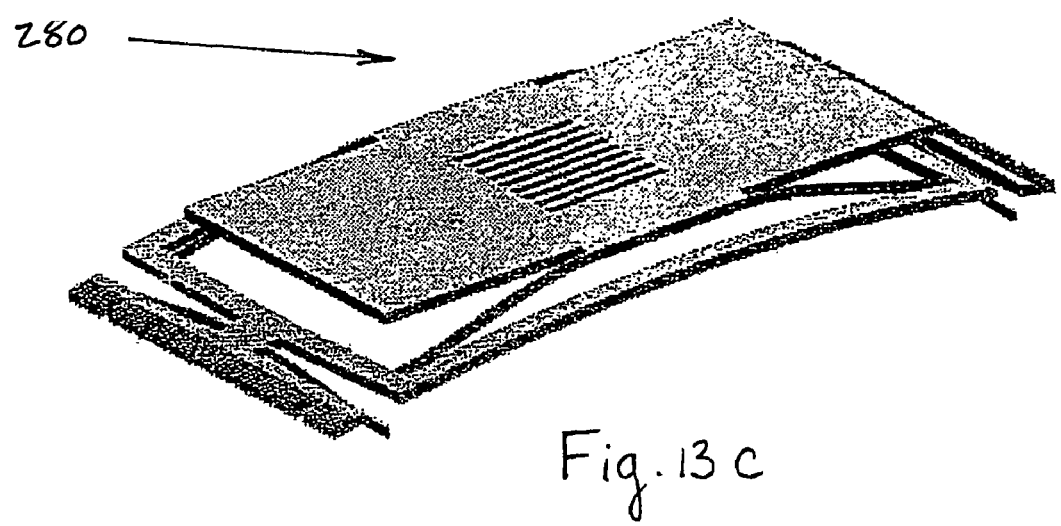
FIG. 13c is a schematic illustration of the third of three modes of the rate-gyroscope case study derived from finite element results, i.e., with typical natural frequency at least 5 times higher than either the sensing mode or the excitation mode, in accordance with an exemplary embodiment of the present invention.

FIG. 13c is a schematic illustration of the third of three modes 280 of the rate-gyroscope case study derived from finite element results, i.e., with typical natural frequency at least 5 times higher than either the sensing mode or the excitation mode, in accordance with an exemplary embodiment of the present invention.

In order to confirm the lumped model of the rate-gyroscope and the assumptions used in the derivations, finite elements (FEM) analysis was performed for several structures. The first two main modes of the gyro, the sensing mode and output mode, which were derived from the FEM analysis, are exhibited in FIGS. 13a and 13b, confirm the discussion above on the sensing mode and excitation mode. The third mode in FIG. 13c shows a typical natural frequency at least 5 times higher than the main modes. The FEM results are exhibited as data points 232 in FIGS. 12a and 12b, showing very good correlation with the lumped model and assumptions. In order to more quantitatively estimate the relative error, the FEM results are summarized in TABLE III showing an average error less than 2%. The upper part of TABLE III labeled (a), corresponds to the output mode of FIGS. 12a and 13a, while the lower part of TABLE III labeled (b), corresponds to the output mode of FIGS. 12b and 13b. The more important positive result is the % split between the natural frequencies, which is also calculated in TABLE III, and shows the same average. Thus, the analytical model can be used as a good starting point for calculating the design dimensions, and any refinement can be done using FEM analysis, if required.

TABLE III

| $L_{ko}$ [μm] | $L_{ke}$ [μm] | $f_n$ (lumped) [Hz] | $f_{ne}$ (FEM) [Hz] | $f_{no}$ (FEM) [Hz] | $f_{ne}$ error (%) | $f_{no}$ error (%) | Split (%) |
|---|---|---|---|---|---|---|---|
| (a) | | | | | | | |
| 587.3 | 534.8 | 1000 | 994.7 | 1000.4 | 0.53 | 0.04 | 0.57 |
| 369.5 | 336.2 | 2000 | 1995.7 | 2010.5 | 0.21 | 0.53 | 0.74 |
| 281.9 | 256.4 | 3000 | 2995.5 | 3042.1 | 0.15 | 1.40 | 1.56 |
| 232.6 | 211.5 | 4000 | 4006.5 | 4099.2 | 0.16 | 2.48 | 2.31 |
| 200.4 | 182.2 | 5000 | 5054.8 | 5117.4 | 1.10 | 2.35 | 1.24 |
| 177.5 | 161.4 | 6000 | 6041.2 | 6296.3 | 0.69 | 4.94 | 4.22 |
| 160.1 | 145.6 | 7000 | 7201.0 | 7336.7 | 2.87 | 4.81 | 1.88 |
| 146.5 | 133.2 | 8000 | 8167.7 | 8372.1 | 2.10 | 4.65 | 2.50 |
| (b) | | | | | | | |
| 742.7 | 675.5 | 2000 | 1974.7 | 1989.3 | 1.26 | 0.53 | 0.74 |
| 566.0 | 514.5 | 3000 | 2953.0 | 2981.0 | 1.57 | 0.63 | 0.95 |
| 466.9 | 424.3 | 4000 | 3938.7 | 3990.0 | 1.53 | 0.25 | 1.30 |
| 402.2 | 365.4 | 5000 | 4917.0 | 4993.1 | 1.66 | 0.14 | 1.55 |
| 356.0 | 323.4 | 6000 | 5897.2 | 6004.8 | 1.71 | 0.08 | 1.82 |
| 321.1 | 291.7 | 7000 | 6883.1 | 6995.2 | 1.67 | 0.07 | 1.63 |
| 293.7 | 266.8 | 8000 | 7458.6 | 7835.4 | 6.77 | 2.06 | 5.05 |

Another issue the rate-gyroscope design is the relation between the excitation amplitude and applied voltage. In the current comb-drive configuration the common electrode, i.e. the gyroscope structure, is connected to a DC voltage $V_{DC}$. The fixed electrodes are connected to an AC voltage, $V_{AC}$, with a 180° phase shift. Thus, the effective excitation force acting on excitation mass is given by $$F_{eff} = \frac{n_c \varepsilon_0 T}{W_{ct}}(V_{DC} + V_{AC})^2 - \frac{n_c \varepsilon_0 T}{W_{ct}}(V_{DC} - V_{AC})^2 \quad (25)$$

$$= 4\frac{n_c \varepsilon_0 T}{W_{ct}} V_{DC} V_{AC}$$

$$\cong \frac{\varepsilon_0 T L_{cs}}{W_{ct}^2} V_{DC} V_{AC}$$

where $n_c$ is the number of fingers in each comb and $\varepsilon_0$ is the dielectric constant of the vacuum. Thus, the excitation force is approximately independent of the excitation motion and linear with the applied AC voltage. The DC voltage can be used to control the excitation amplitude in closed loop and the frequency of the AC voltage to lock the excitation frequency at the natural frequency.

Assuming that the excitation frequency is locked at the excitation natural frequency, the excitation amplitude is given by, $$\delta z = \frac{\varepsilon_0 T L_{cs}}{2W_{ct}^2 \zeta_z \omega_n^2 (m_{sen} + m_{exc})} V_{DC} V_{AC} \quad (26)$$

For the typical values in TABLE II and assuming $|V_{AC}|=5$ [V], $\zeta_z=10^{-4}$ and $f_n=2000$[Hz], the amplitude per 1[V] DC is 8.67[μm]. Thus, the amplitudes used in the calculations are easily achieved in the discussed frequency range using only several volts of excitation.

Fabrication Process

In order to achieve good dimensional control and electrical isolation between several electrodes at the mechanical structure level, as was required by the rate-gyroscope design, a fabrication process employing silicon on insulator (SOI) and deep reactive ion etching (DRIE) was developed. The process flow is shown in FIG. 13 and includes three photolithography steps.

The process starts with an SOI wafer with an upper p++ silicon layer, provided by BCO Technologies, for example. The first lithography defines the electrical conductors on an evaporated aluminum layer. The second lithography defines the openings in the upper silicon wafer followed by a DRIE step. The third lithography step defines the openings in the handle, i.e., lower silicon wafer, using backside alignment, and is followed by a second DRIE step. The backside opening provides an optical path to the illumination. Hydro fluoride acid (HF) solution is used in the last step to remove the leftover oxides, thereby releasing the structure. The mechanical structure is then separated from the wafer and flip-chip bonded. Using the indium bumps technology, bonding is accomplished to the CMOS chip containing the photodiodes and readout electronics. The grid, described hereinabove, is used to align the structure with the photodiodes.

Figure 14:
FIG. 14 is a schematic illustration of the fabrication process of the inertial-sensors; (a) silicon on insulator (SOI) starting wafer; (b) metal evaporation and patterning; (c) upper silicon patterning using deep reactive ion etching (DRIE); (d) handle silicon patterning and (e) device release using HF wet etching of remaining $SiO_2$, in accordance with an exemplary embodiment of the present invention.
Figure 14:
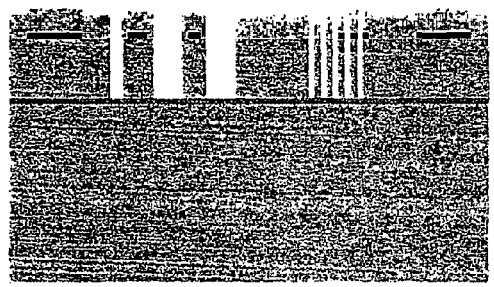
Figure 14:
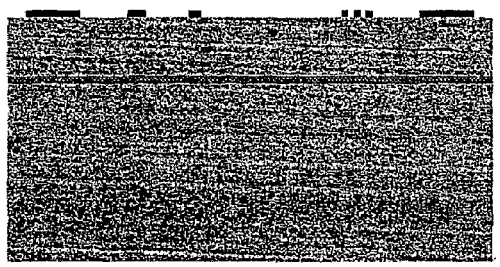
Figure 14:
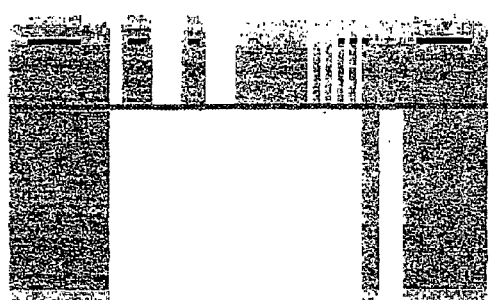
Figure 14:
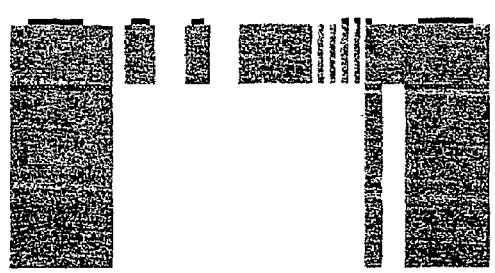

FIG. 14 is a schematic illustration of the fabrication process 290 of the inertial-sensors comprising the following steps: (a) silicon on insulator (SOI) starting wafer; (b) metal evaporation and patterning; (c) upper silicon patterning using deep reactive ion etching (DRIE); (d) handle silicon patterning and (e) device release using HF wet etching of remaining $SiO_2$, in accordance with an exemplary embodiment of the present invention.

Illumination Power Fluctuations and Noise

In the analysis of the noise sources, provided hereinabove in the sensing the description of the setup apparatus, the illumination power is assumed to be constant and to have infinite time coherence. Thus, the noise contributed by the photocurrent is assumed to be only due to the statistical behavior of the photons capture in the photodiodes. Since the power of all the illumination sources cannot be assumed constant, and the illumination power is actually fluctuating in time, this may contribute another noise source to the micro-system.

The nature of the power fluctuations of the illumination source is highly dependent on the type of illumination source. In lasers this is attributable to spontaneous emission. In black bodies and LED's a gaussian form for distribution of the electromagnetic field can be assumed. It was shown that for illumination in the visible light and near infrared, these contributions due to the fluctuations in the illumination power are negligible.

In order to confirm the analysis of the illumination power, the photocurrent noise is measured for several values of illumination power, using the specific LED to be used in the microsystem. The results are shown in FIG. 15, showing very good correlation with the $2qI_L$ assumption, and confirming that the illumination power fluctuations are indeed negligible.

Figure 15:
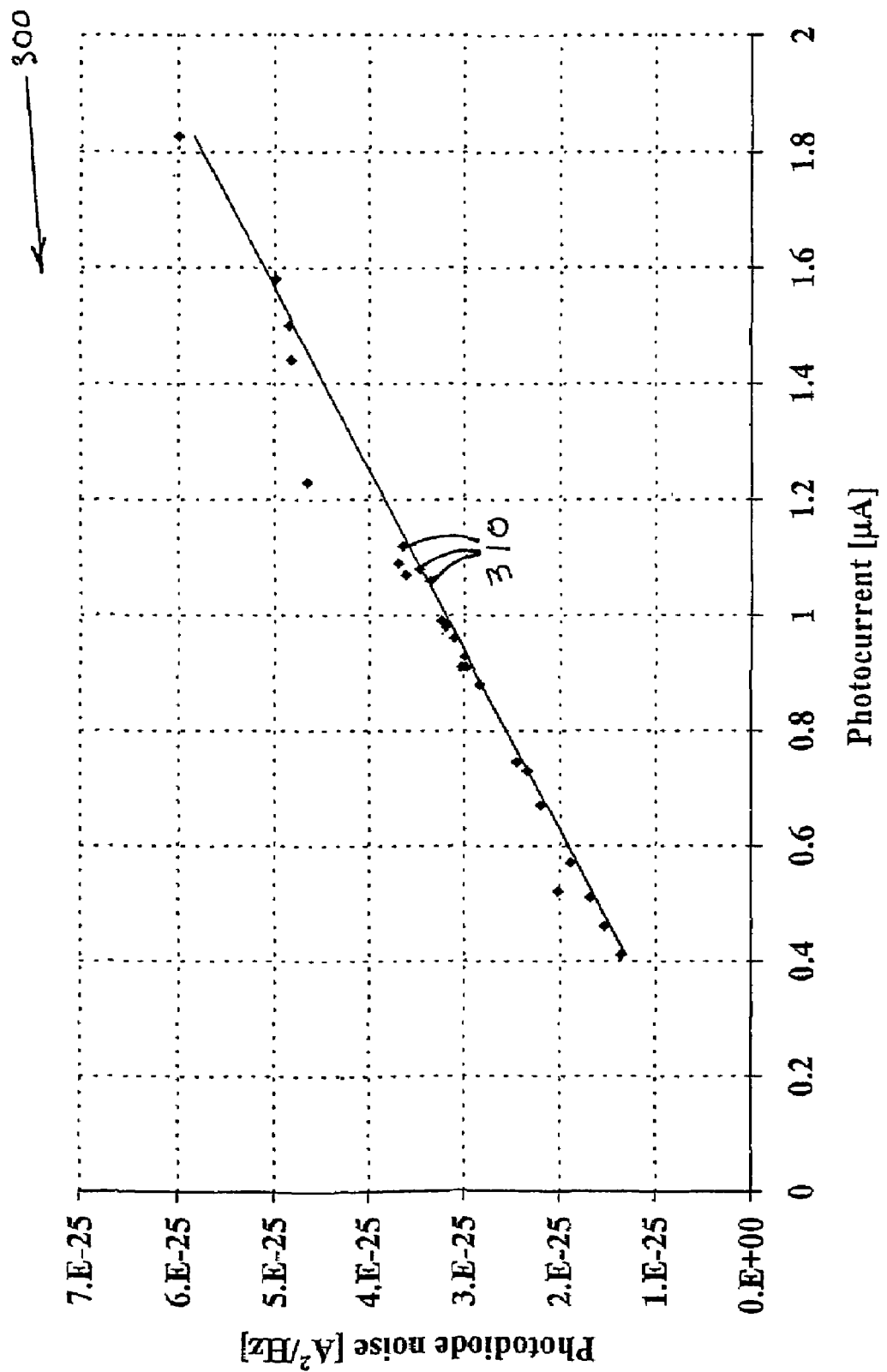
FIG. 15 is a graph representing the measured photocurrent noise spectral density vs. photocurrent for different illumination powers provided by a red light emitting diode (LED) used in the microsystem, in accordance with an exemplary embodiment of the present invention.

FIG. 15 is a graphical representation of the measured photocurrent noise spectral density vs. photocurrent 300 for different illumination powers 310 provided by a red light emitting diode (LED) used in the microsystem, in accordance with an exemplary embodiment of the present invention.

Photodiodes Responsivity

Another issue regarding the photodiodes is the dependence of the responsivity upon their width. In order to characterize this effect, photodiodes with several widths are fabricated using Orbit□ 2 μm process provided by MOSIS.

Figure 16:
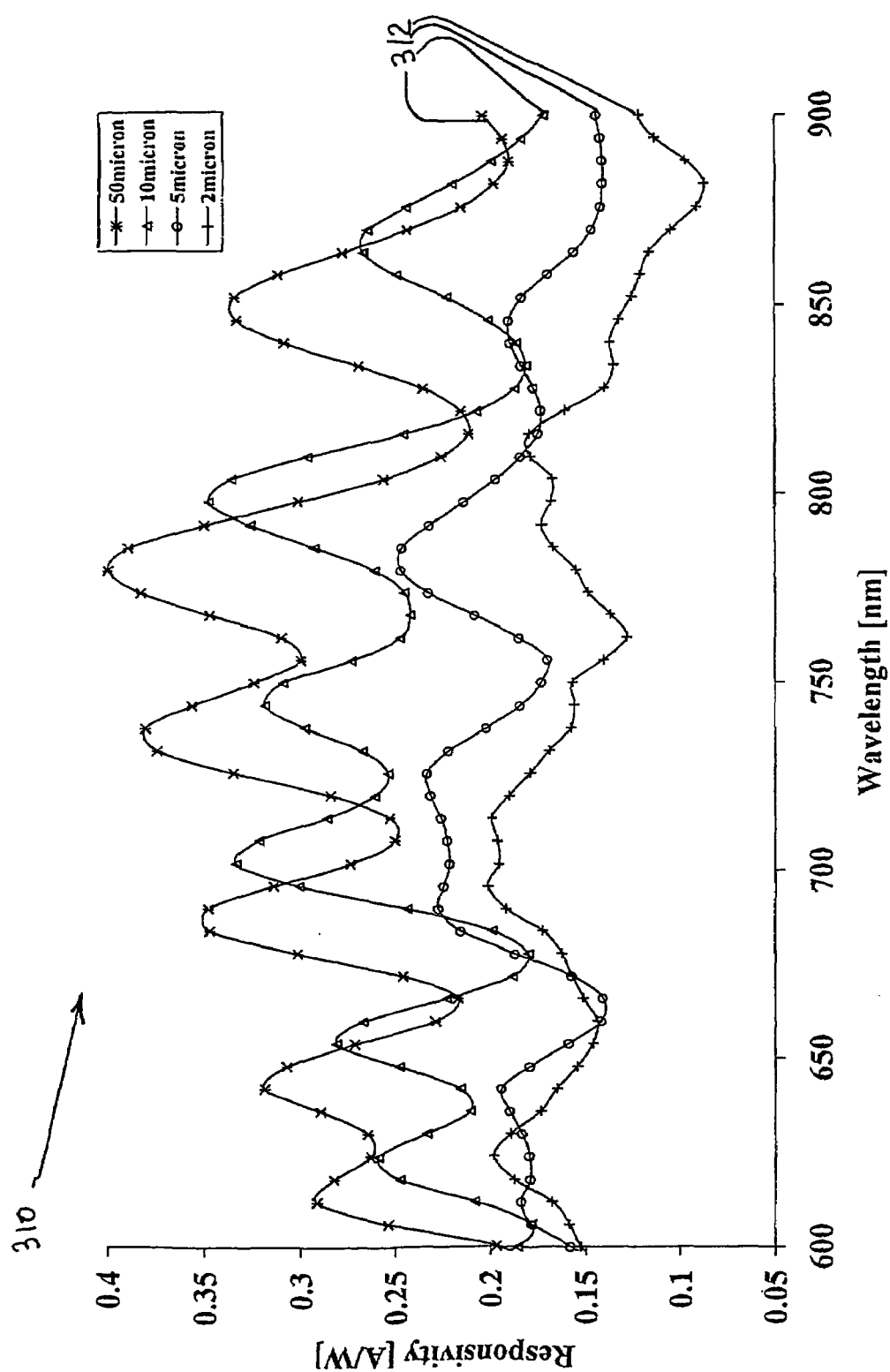
FIG. 16 is a graph representing the measured spectral responses of photodiodes with different optical window width. The photodiodes were fabricated in a standard CMOS process provided by Orbit via the MOSIS project, in accordance with an exemplary embodiment of the present invention.

The spectral response of the photodiodes is recorded in the range of 600[nm] to 900[nm] and is exhibited in FIG. 16. The fluctuations are due to the febry-perot effect attributed to the oxides above the photodiodes. The figure shows that the responsivity of the photodiode is reduced as the width is reduced. This is due to the reduced charge collection by the junction, which covers less spatial area under the surface. The responsivity is within the range of 0.1–0.4 [A/W], depending on the wavelength, which satisfies the above calculations and estimations fairly well. Some correcting factor can be used for the responsivity, but due to the weak dependency observed from FIG. 16, this dependency can be neglected.

FIG. 16 is a graphical representation of the measured spectral responses of photodiodes 310 with different optical window widths 312. The photodiodes are fabricated in a standard CMOS process provided by Orbit□ via the MOSIS project, in accordance with an exemplary embodiment of the present invention.

Diffraction Effects

Also to be considered is the effect of diffraction on the performance of the E-MIDOS, and sensor performance. Since the grid slits are long and narrow, the effect of diffraction can be estimated by using a two dimensional model. The first dimension is the along the motion, or the slit width, i.e. the x-direction. The second dimension is along the illumination propagation path between the grid and the photodiodes, which is denoted as the z-direction.

The diffraction pattern can be approximated by assuming that the grid acts like a mask to the illumination propagation. Then, after it traverses the mask, the illumination is disassembled into its basic plane waves, using the Fourier transform. The propagation of each of the plane waves along the z-axis is summed at the required z-plane, yielding the diffraction pattern, i.e.

$$f(x,z) = F^{-1}\{F\{f(x,0)\} \times \exp(iz\sqrt{K_0^2 - K_x^2})\} \quad (27)$$

where $F\{\ \}$, $F^{-1}\{\ \}$ are the Fourier and inverse Fourier transforms, respectively, $k_x$ is the wave vector along the x-axis and $k_0 = 2\pi/\lambda$, where $\lambda$ is the illumination wavelength. The total power falling on the photodiodes is then given by $$P = \int_{-W_D+x}^{W_D+x} |f(x,z)|^2 \, dx \quad (28)$$

and the photocurrent is directly proportional to it.

FIG. 17a is a graphical representation of the effect of diffraction on the sensing of the displacement using EMIDOS 320, showing the diffraction patterns at the photodiodes plane for various distances 322, dz, between the grid and photodiodes, in accordance with an exemplary embodiment of the present invention.

That is, FIG. 17a presents the illumination diffraction pattern at several z-planes for the parameters used in the design of the sensors as shown hereinabove in TABLE I AND TABLE II. For z-planes further away from the grid, the diffraction pattern becomes less constant, and apparently deviates more from the optical approximations of the raysoptics.

Figure 17B:
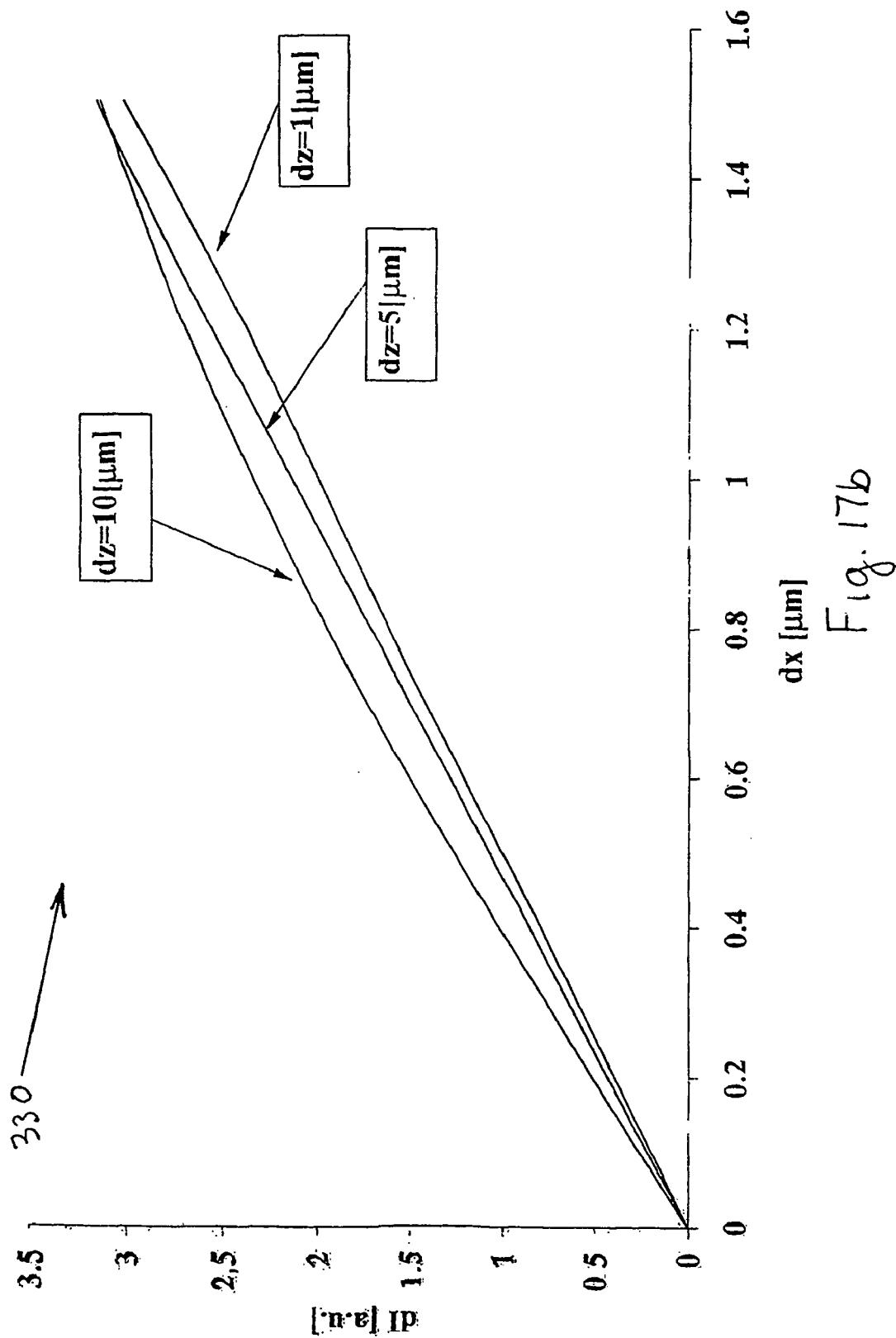
FIG. 17b is a graph representing the effect of diffraction on the sensing of the displacement using EMIDOS, showing the differential response of the photodiodes taking into account the diffraction pattern vs. the grid displacement, and exhibiting very good linearity at small displacements with only slight non-linearity at large dz's and large displacements of the grid, in accordance with an exemplary embodiment of the present invention.

FIG. 17b is a graphical representation of the effect of diffraction on the sensing of the displacement using EMIDOS 330, showing the differential response of the photodiodes taking into account the diffraction pattern vs. the grid displacement dx, and exhibiting very good linearity at small displacements with only slight non-linearity at large dz's 322 and large displacements of the grid dx, in accordance with an exemplary embodiment of the present invention.

Since the diffraction pattern itself does not explain all the phenomena, the power difference between the two photodiode grids is calculated using equation (28) and is exhibited in FIG. 17b. This surprisingly shows that even though a diffraction pattern may be far different from the simple rays optic distribution, the integral of the illumination is quite linear with the displacement, with only a slight divergence from linearity for very large displacements. The only real difference for email displacements is the actual slope, which may be changed slightly due to the diffraction effect. Thus, the approxiations used in the performance estimations are justified, with only a slight correction, which can be compensated for by the illumination power used. Regarding the linearity, it is clearly seen that good linearity is expected.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

The invention claimed is:

1. A micro-opto-electro-mechanical system for measuring the acceleration of a platform along a fixed axis, using partially integrated mode enhanced modulated integrative differential optical sensing, said system comprising:

a CMOS chip comprising at least two integrated arrays of photodiode illumination detectors and analog readout electronics;

a frame affixed to said CMOS chip;

an LED mounted above said frame, providing illumination for said photodiode detectors;

a sensing proof-mass, elastically suspended by a set of beams fixed to said frame;

a grid of slits integrally formed with said sensing proof-mass, and being orthogonal to said fixed acceleration axis, such that when said system is at rest, said grid evenly and partially covers each of said arrays of photodiode detectors, so that equal amounts of light illuminate each of said arrays and equal photocurrents are measured at each of said arrays, and when said platform accelerates, said sensing proof-mass is displaced along said fixed acceleration axis, thereby increasing the exposed area of one of said arrays of photodiode detectors to illumination, while decreasing the exposed area of another one of said arrays of photodiode detectors, and increasing a resulting differential photocurrent from said arrays of photodiode detectors, said differential photocurrent being proportional to the displacement of said sensing proof-mass and therefore to the acceleration, thus providing a measurement of the acceleration of said platform.

2. A system according to claim 1, wherein said micro-opto-electro-mechanical system is mass-produced.

3. A system according to claim 1, further comprising a second grid of slits and at least two additional arrays of photodiodes, wherein said at least two additional arrays of photodiodes and said second grid of slits are orthogonal to each other for measuring acceleration along multiple axes.

4. A system according to claim 1, wherein said analog readout electronics comprises:

an amplification stage for each of said arrays of photodiode detectors; and
a subtraction stage.

5. A micro-opto-electro-mechanical system for measuring the acceleration of a platform along a fixed axis using fully integrated mode enhanced modulated integrative differential optical sensing, said system comprising:
 a CMOS chip comprising at least two integrated arrays of photodiode illumination detectors and analog readout electronics;
 a frame affixed to said CMOS chip;
 an LED mounted above said frame, providing illumination for said photodiode detectors;
 a sensing proof-mass, elastically suspended by a set of beams fixed to said frame;
 a first grid of slits integrally formed with said sensing proof-mass, and being orthogonal to said acceleration axis;
 a second grid of slits fixed to said frame, and centered with said first grid of slits,
 such that when said system is at rest, said first and second grid of slits are evenly and fully exposed to each of said arrays and photocurrents are measured at each of said arrays,
 and when said platform accelerates, said sensing proof-mass is displaced along said fixed acceleration axis, and said first grid is displaced with respect to said second grid, thereby increasing the gap on one side between said first and second grid of slits and therefore increasing the exposed area of one of said arrays of photodiode detectors to illumination, while decreasing the gap on the other side between said first and second grid of slits and therefore decreasing the exposed area of another one of said arrays of photodiode detectors, and increasing a resulting differential photocurrent from said arrays of photodiode detectors, said differential photocurrent being proportional to the displacement of said sensing proof-mass and therefore to the acceleration,
 thus providing a measurement of the acceleration of said platform.

6. A system according to claim 5, wherein said micro-opto-electro-mechanical system is mass-produced.

7. A system according to claim 5, further comprising at least two additional arrays of photodiodes, wherein said at least two additional arrays of photodiodes and said second grid of slits are orthogonal to each other for measuring acceleration along multiple axes.

8. A system according to claim 5, wherein said analog readout electronics comprises:
 an amplification stage for each of said arrays of photodiode detectors; and
 a subtraction stage.

9. A micro-opto-electro-mechanical system for measuring the rate of rotation of a platform about a fixed axis thereof using partially integrated mode enhanced modulated integrative differential optical sensing, said system comprising:
 a CMOS chip comprising at least two integrated arrays of photodiode illumination detectors and analog readout electronics;
 a frame attached to said CMOS chip;
 an LED mounted above said frame, providing illumination for said photodiode detectors;
 a excitation mass, elastically suspended by a set of beams fixed to said frame,
 such that said excitation mass is allowed to move along excitation axis,
 and said excitation axis is orthogonal to said rate of rotation axis;
 a sensing proof-mass, elastically suspended to said excitation mass by a second set of beams,
 such that sensing proof-mass is allowed to move along sensing axis,
 and said sensing axis is orthogonal to said excitation axis and said rate of rotation axis;
 a grid of slits integrally formed with said sensing proof-mass, and being orthogonal to said sensing axis,
 such that when said system is at rest, said grid evenly and partially covers each of said arrays of photodiode detectors, so that equal amounts of light illuminate each of said arrays and equal photocurrents are measured at each of said arrays,
 and when mechanical vibration is applied along said excitation axis and said platform rotates about said rate of rotation axis, said sensing proof-mass is displaced along said sensing axis due to Coriolis forces, thereby increasing the exposed area of one of said arrays of photodiode detectors to illumination while decreasing the exposed area of another one of said arrays of photodiode detectors to illumination, and increasing a resulting differential photocurrent from said arrays of photodiode detectors, said differential photocurrent being proportional to the displacement of said sensing proof-mass and therefore to the rate of rotation,
 thus providing a measurement of the rate of rotation of said platform.

10. A system according to claim 9, wherein said micro-opto-electro-mechanical system is mass-produced.

11. A system according to claim 9, further comprising a second grid of slits and at least two additional arrays of photodiodes, wherein said at least two additional arrays of photodiodes and said second grid of slits comprise multiple arrays and grids orthogonal to each other for measuring the rate of rotation about multiple axes.

12. A system according to claim 9, wherein said analog readout electronics comprises:
 an amplification stage for each of said arrays of photodiode detectors; and
 a subtraction stage.

13. A system according to claim 9, wherein said mechanical vibration results from electrostatic actuation.

14. A system according to claim 9, wherein said mechanical vibration results from magnetostatic actuation.

15. A system according to claim 9, wherein said mechanical vibration results from piezoelectric actuation.

16. A system according to claim 9, wherein said mechanical vibration results from thermal actuation.

17. A micro-opto-electro-mechanical system for measuring the rate of rotation of a platform about a fixed axis thereof using fully integrated mode enhanced modulated integrative differential optical sensing, said system comprising:
 a CMOS chip comprising at least two integrated arrays of photodiode illumination detectors and analog readout electronics;
 a frame attached to said CMOS chip;
 an LED mounted above said frame, providing illumination for said photodiode detectors;
 an excitation mass, elastically suspended by a set of beams fixed to said frame,
 such that said excitation mass is allowed to move along an excitation axis,
 and said excitation axis is orthogonal to said rate of rotation axis;

a sensing proof-mass, elastically suspended to said excitation mass by a second set of beams, such that sensing proof-mass is allowed to move along a sensing axis, and said sensing axis is orthogonal to said excitation axis and said rate of rotation axis;

a first grid of slits integrally formed with said sensing proof-mass, and being orthogonal to said sensing axis;

a second grid of slits fixed to said frame, and centered with said first grid of slits, such that when said system is at rest, said first and second grid of slits are evenly and fully exposed to each of said arrays of photodiode detectors, so an even amount of light illuminating each of said arrays and a photocurrent is measured at each of said arrays, and when mechanical vibration is applied along said excitation axis and said platform rotates about said rate of rotation axis, said sensing proof-mass is displaced along said sensing axis due to Coriolis forces and said first grid is displaced with respect to said second fixed grid, thereby increasing the gap on one side between said first and second grid of slits and therefore increasing the exposed area of one of said arrays of photodiode detectors to illumination and decreasing the gap on the other side between said first and second grid of slits and therefore decreasing the exposed area of another one of said arrays of photodiode detectors, and increasing a resulting differential photocurrent from said arrays of photodiode detectors, said differential photocurrent being proportional to the displacement of said sensing proof-mass and therefore to the rate of rotation, thus providing a measurement of the rate of rotation of said platform.

18. A system according to claim 17, wherein said micro-opto-electro-mechanical system is mass-produced.

19. A system according to claim 17, further comprising at least two additional arrays of photodiodes, wherein said at least two additional arrays of photodiodes and said second grid of slits comprise multiple arrays and grids orthogonal to each other for measuring the rate of rotation about multiple axes.

20. A system according to claim 17, wherein said analog readout electronics comprises:
an amplification stage for each of said arrays of photodiode detectors; and
a subtraction stage.

21. A system according to claim 17, wherein said mechanical vibration results from electrostatic actuation.

22. A system according to claim 17, wherein said mechanical vibration results from magnetostatic actuation.

23. A system according to claim 17, wherein said mechanical vibration results from piezoelectric actuation.

24. A system according to claim 17, wherein said mechanical vibration results from thermal actuation.

25. A partially integrated mode enhanced-modulated-integrative-differential-optical-sensing apparatus for measuring displacement along a given axis, said apparatus comprising:
a CMOS chip comprising at least two integrated arrays of photodiode illumination detectors and analog readout electronics;
a frame affixed to said CMOS chip;
an LED mounted above said frame, providing illumination for said photodiode detectors;
a sensing proof-mass, elastically suspended by a set of beams fixed to said frame;
a grid of slits integrally formed with said sensing proof-mass, and being orthogonal to said given displacement axis,
such that when said system is at rest, said grid evenly and partially covers each said arrays of photodiode detectors, so that equal amounts of light illuminate each of said arrays and equal photocurrents are measured at each of said arrays,
and when said sensing proof-mass is displaced along said given displacement axis,
the exposed area to illumination of one of said arrays of photodiode detectors is increased and the exposed area of another one of said arrays of photodiode detectors is decreased,
such that a resulting differential photocurrent from said arrays of photodiodes is increased, said differential photocurrent being proportional to the displacement of said sensing proof-mass,
thus measuring the displacement of said apparatus.

26. A fully integrated mode enhanced-modulated-integrative differential-optical-sensing apparatus for measuring displacement along a given axis, said apparatus comprising:
a CMOS chip comprising at least two integrated arrays of photodiode illumination detectors and analog readout electronics;
a frame affixed to said CMOS chip;
an LED mounted above said frame, providing illumination for said photodiode detectors;
a sensing proof-mass, elastically suspended by a set of beams fixed to said frame;
a first grid of slits integrally formed with said sensing proof-mass, and being orthogonal to said given displacement axis;
a second grid of slits fixed to said frame, and centered with said first grid of slits,
such that when said system is at rest, said first and second grid of slits are evenly and fully exposed to each of said arrays of photodiode detectors, so that equal amounts of light illuminate each of said arrays and equal photocurrents are measured at each of said arrays,
and when said sensing proof-mass is displaced along said given displacement axis, and said first grid is displaced with respect to said second fixed grid,
thereby increasing the gap on one side between said first and second grid of slits and therefore increasing the exposed area of one of said arrays of photodiode detectors to illumination and decreasing the gap on the other side between said first and second grid of slits and therefore decreasing the exposed area of another one of said arrays of photodiode detectors,
such that a resulting differential photocurrent from said arrays of photodiode detectors is increased, said differential photocurrent being proportional to the displacement of said sensing proof-mass;
thus measuring the displacement of said apparatus.

* * * * *